US012567918B2

(12) United States Patent　　　　(10) Patent No.:　US 12,567,918 B2
Patel et al.　　　　　　　　　　　　 (45) Date of Patent:　　　　Mar. 3, 2026

(54) IMPROVING TIME SYNCHRONIZATION ACCURACY IN A WIRELESS NETWORK

(71) Applicant: Telefonaktiebolaget LM Ericsson (publ), Stockholm (SE)

(72) Inventors: Dhruvin Patel, Aachen (DE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 317 days.

(21) Appl. No.: 18/565,667

(22) PCT Filed: Jun. 3, 2022

(86) PCT No.: PCT/SE2022/050545
　　§ 371 (c)(1),
　　(2) Date: Nov. 30, 2023

(87) PCT Pub. No.: WO2022/255932
　　PCT Pub. Date: Dec. 8, 2022

(65) Prior Publication Data
　　US 2024/0267144 A1　　Aug. 8, 2024

Related U.S. Application Data

(60) Provisional application No. 63/197,096, filed on Jun. 4, 2021.

(51) Int. Cl.
　　*H04J 3/06*　　　　(2006.01)
　　*H04W 56/00*　　　(2009.01)
(52) U.S. Cl.
　　CPC ....... *H04J 3/0664* (2013.01); *H04W 56/0015* (2013.01)
(58) Field of Classification Search
　　CPC .......................... H04J 3/0664; H04W 56/0015
　　See application file for complete search history.

(56) References Cited

U.S. PATENT DOCUMENTS

2020/0229124 A1 *　7/2020　Soriaga ................. H04W 4/023
2021/0099341 A1　　4/2021　Moon et al.
(Continued)

FOREIGN PATENT DOCUMENTS

WO　　2020067977 A1　　4/2020
WO　　2020104953 A1　　5/2020
(Continued)

OTHER PUBLICATIONS

"3GPP TS 23.501 V17.0.0", 3rd Generation Partnership Project; Technical Specification Group Services and System Aspects; System architecture for the 5G System (5GS); Stage 2 (Release 17), Mar. 2021, pp. 1-489.
"Integration of 5G with Time-Sensitive Networking for Industrial Communications", 5G Alliance for Connected Industries and Automation (5G-ACIA), White Paper, Feb. 2021, pp. 1-25.
(Continued)

*Primary Examiner* — Tejis Daya
(74) *Attorney, Agent, or Firm* — Murphy, Bilak & Homiller, PLLC

(57)　　　　　　　ABSTRACT
Embodiments include methods for a controller of a plurality of user equipment (UEs) that are served by a radio access network (RAN) node. Such methods include receiving information about the following from each of the UEs: first measurements, $UE_{DL,RX}$, of respective timing events of the radio link between the UE and the RAN node; and second measurements, $UE_{RxTxDiff}$, of respective time differences between the UE receiving a downlink reference signal, RS, and transmitting a corresponding uplink RS. Such methods also include, based on the received information, selecting one of the plurality of UEs to provide a time-sensitive network (TSN) end station with a TSN message time-stamped by a system clock time that is associated with the RAN and that is based on at least one first measurement and at least one second measurement. Other embodiments include complementary methods for a UE, and controllers and UEs configured to perform such methods.

20 Claims, 12 Drawing Sheets

(56)  References Cited

U.S. PATENT DOCUMENTS

| | | | | |
|---|---|---|---|---|
| 2021/0297174 | A1* | 9/2021 | Vincent | G06F 1/14 |
| 2022/0052954 | A1* | 2/2022 | Leung | A63F 13/44 |
| 2024/0057004 | A1* | 2/2024 | Ashraf | H04W 56/0045 |

FOREIGN PATENT DOCUMENTS

| | | |
|---|---|---|
| WO | 2020151806 A1 | 7/2020 |
| WO | 2021141296 A1 | 7/2021 |
| WO | 2021225511 A1 | 11/2021 |
| WO | 2022023556 A1 | 2/2022 |
| WO | 2022027666 A1 | 2/2022 |

OTHER PUBLICATIONS

"Propagation Delay Compensation Enhancements for Time Synchronization", 3GPP TSG-RAN WG1#104-bis-e, Tdoc R1-2102748, Electronic meeting, Apr. 12-20, 2021, pp. 1-10.

"3GPP TS 38.133 V17.0.0", 3rd Generation Partnership Project; Technical Specification Group Radio Access Network; NR; Requirements for support of radio resource management (Release 17), Dec. 2020, pp. 1-1812.

Chai, Zichao, et al., "Cross Domain Clock Synchronization Based on Data Packet Relay in 5G-TSN Integrated Network", 2021 IEEE 4th International Conference on Electronics and Communication Engineering, 2021, pp. 141-145.

Gódor, Istvan, et al., "A Look Inside 5G Standards to Support Time Synchronization for Smart Manufacturing", IEEE Communications Standards Magazine, Sep. 2020, pp. 14-21.

Patel, Dhruvin, et al., "Time error analysis of 5G time synchronization solutions for time aware industrial networks", 2021 IEEE International Symposium on Precision Clock Synchronization for Measurement, Control, and Communication (ISPCS), 2021, pp. 1-6.

Shi, et al., "Evaluating the Performance of Over-the-Air Time Synchronization for 5G and TSN Integration", 2021 IEEE International Black Sea Conference on Communications and Networking (BlackSeaCom), 2021, pp. 1-6.

* cited by examiner

UPF: User Plane Function
NRF: Network Repository Function
AMF: Access Management Function
SMF: Session Management Function
NEF: Network Exposure Function
PCF: Policy Control Function
UDM: Unified Data Management

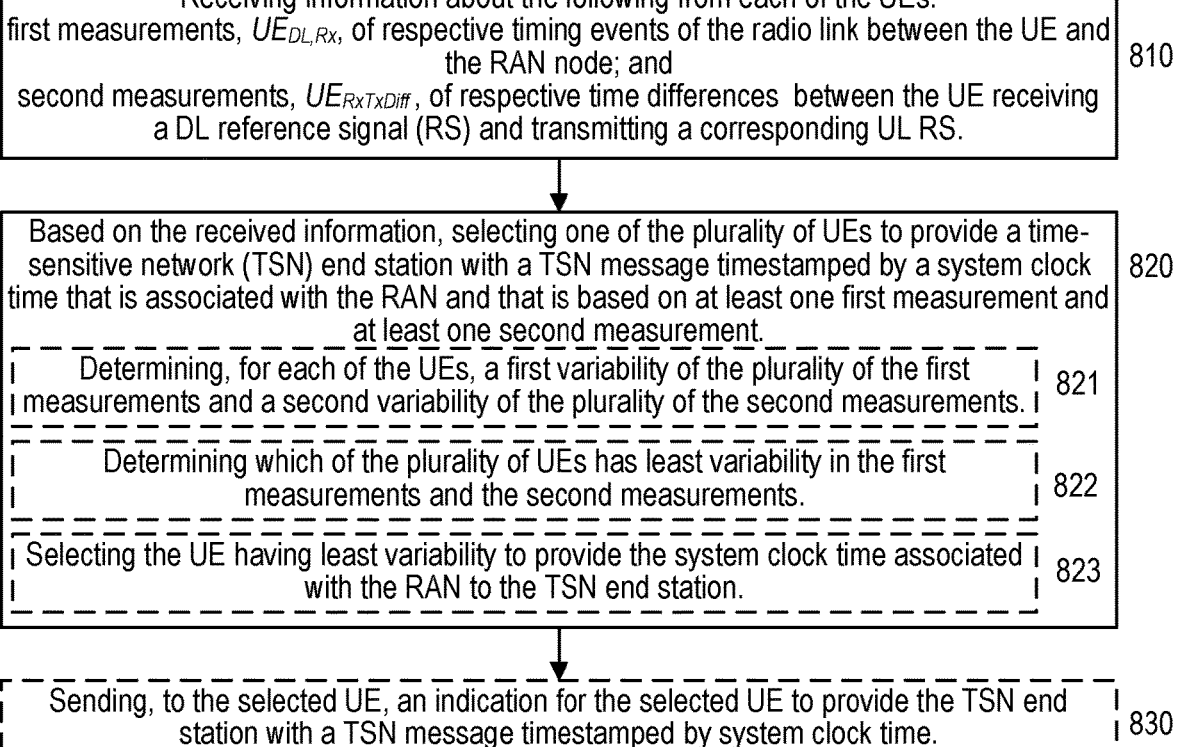

Receiving information about the following from each of the UEs:
first measurements, $UE_{DL,Rx}$, of respective timing events of the radio link between the UE and the RAN node; and
second measurements, $UE_{RxTxDiff}$, of respective time differences between the UE receiving a DL reference signal (RS) and transmitting a corresponding UL RS.

810

Based on the received information, selecting one of the plurality of UEs to provide a time-sensitive network (TSN) end station with a TSN message timestamped by a system clock time that is associated with the RAN and that is based on at least one first measurement and at least one second measurement.

820

Determining, for each of the UEs, a first variability of the plurality of the first measurements and a second variability of the plurality of the second measurements.

821

Determining which of the plurality of UEs has least variability in the first measurements and the second measurements.

822

Selecting the UE having least variability to provide the system clock time associated with the RAN to the TSN end station.

823

Sending, to the selected UE, an indication for the selected UE to provide the TSN end station with a TSN message timestamped by system clock time.

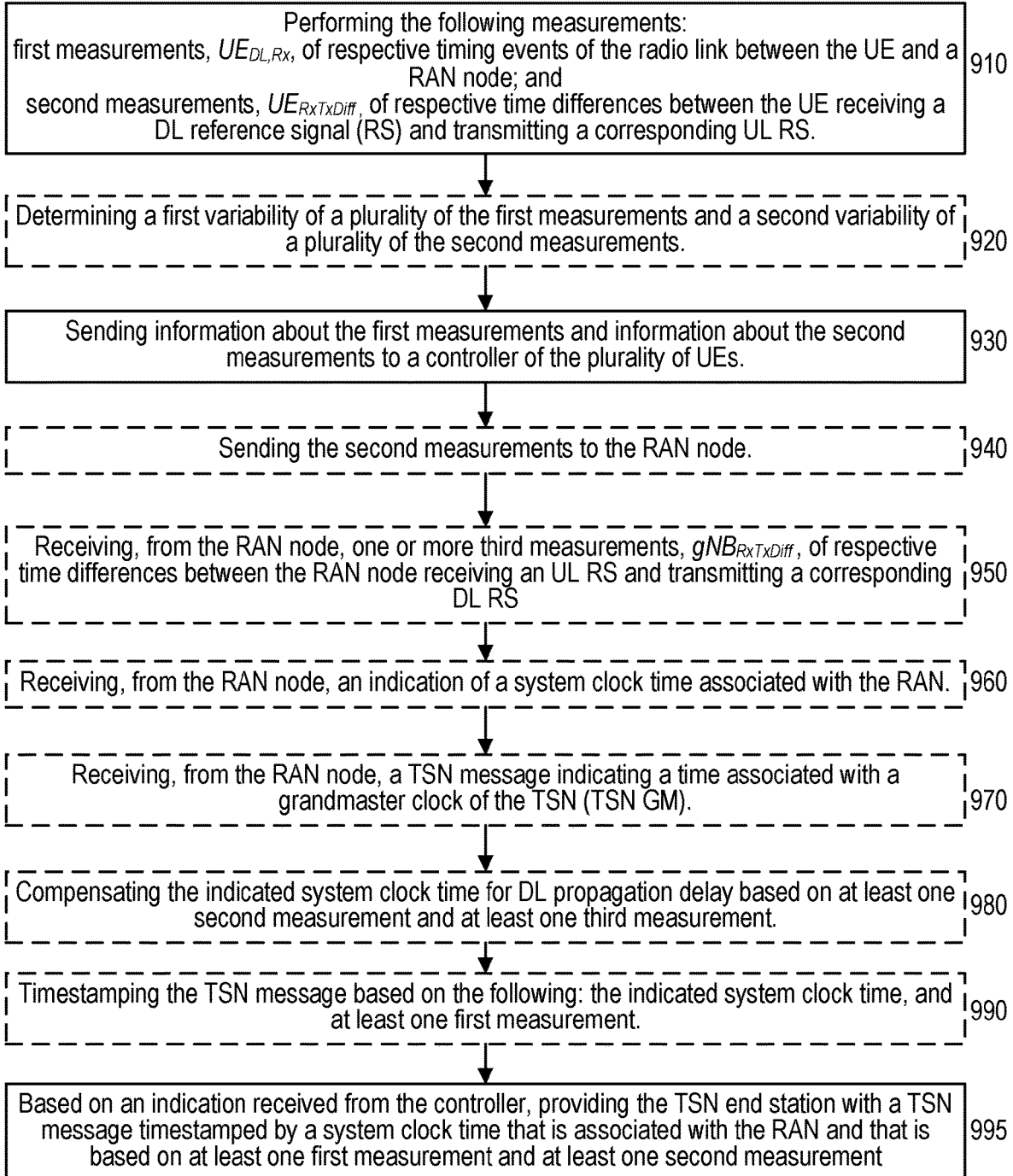

Performing the following measurements:
first measurements, $UE_{DL,Rx}$, of respective timing events of the radio link between the UE and a RAN node; and
second measurements, $UE_{RxTxDiff}$, of respective time differences between the UE receiving a DL reference signal (RS) and transmitting a corresponding UL RS.   910

Determining a first variability of a plurality of the first measurements and a second variability of a plurality of the second measurements.   920

Sending information about the first measurements and information about the second measurements to a controller of the plurality of UEs.   930

Sending the second measurements to the RAN node.   940

Receiving, from the RAN node, one or more third measurements, $gNB_{RxTxDiff}$, of respective time differences between the RAN node receiving an UL RS and transmitting a corresponding DL RS   950

Receiving, from the RAN node, an indication of a system clock time associated with the RAN.   960

Receiving, from the RAN node, a TSN message indicating a time associated with a grandmaster clock of the TSN (TSN GM).   970

Compensating the indicated system clock time for DL propagation delay based on at least one second measurement and at least one third measurement.   980

Timestamping the TSN message based on the following: the indicated system clock time, and at least one first measurement.   990

Based on an indication received from the controller, providing the TSN end station with a TSN message timestamped by a system clock time that is associated with the RAN and that is based on at least one first measurement and at least one second measurement   995

FIG. 9

IMPROVING TIME SYNCHRONIZATION ACCURACY IN A WIRELESS NETWORK

TECHNICAL FIELD

The present application relates generally to the field of wireless networks and more specifically to techniques for improving time synchronization accuracy in a wireless network, such as when a wireless network and a wireless device are utilized to deliver highly accurate timing information from a time-sensitive network (TSN).

BACKGROUND

Industry 4.0 is a term that often refers to automation and data exchange in manufacturing. It can include concepts and/or technologies such as cyber-physical systems, the Internet of Things (IoT), cloud computing, and cognitive computing. Industry 4.0 is also referred to as the fourth industrial revolution or "I4.0" for short.

One scenario or use case for Industry 4.0 is the so-called "smart factory". Within modular structured smart factories, cyber-physical systems monitor physical processes, create a virtual copy of the physical world, and make decentralized decisions. Over the Internet of Things (IoT), cyber-physical systems communicate and cooperate with each other, and with humans, in real-time both internally and across organizational services offered and used by participants of a value chain of which the smart factory is a part. Such smart factory environment environments are also referred to as Industrial Internet of Things (IIoT).

There are four common principles associated with Industry 4.0. First, "interoperability" requires the ability to connect machines, devices, sensors, and people to communicate with each other via the IoT or, alternatively, the "Internet of People" (IoP). Second, "information transparency" requires information systems to have the ability to create a virtual copy of the physical world by enriching digital models (e.g., of a smart factory) actual with sensor data. For example, this can require the ability to aggregate raw sensor data to higher-value context information.

Third, "technical assistance" requires assistance systems to be able to support humans by aggregating and visualizing information comprehensively for making informed decisions and solving urgent problems on short notice. This principle can also refer to the ability of cyber physical systems to physically support humans by conducting a range of tasks that are unpleasant, too exhausting, or unsafe for their human co-workers. Finally, cyber physical systems should have the ability to make decentralized decisions and to perform their tasks as autonomously as possible. In other words, only in the case of exceptions, interferences, or conflicting goals, should tasks be delegated to a higher level.

These principles associated with Industry 4.0 support various use cases that place many requirements on a network infrastructure. Use cases include simpler ones such as plant measurement to more difficult ones such as precise motion control in a robotized factory cell. To address these requirements, the IEEE 802.1 working group (particularly, task group TSN) has developed a Time Sensitive Networking (TSN) standard. TSN is based on the IEEE 802.3 Ethernet standard, a wired communication standard that is designed for "best effort" quality of service (QoS). TSN describes a collection of features intended to make legacy Ethernet performance more deterministic, including time synchronization, guaranteed low-latency transmissions, and improved reliability. The TSN features available today can be grouped into the following categories (shown below with associated IEEE specifications):

Time Synchronization (e.g., IEEE 802.1AS);

Bounded Low Latency (e.g., IEEE 802.1Qav, IEEE 802.1Qbu, IEEE 802.1Qbv, IEEE 802.1Qch, IEEE 802.1Qcr);

Ultra-Reliability (e.g., IEEE 802.1CB, IEEE 802.1Qca, IEEE 802.1Qci);

Network Configuration and Management (e.g., IEEE 802.1Qat, IEEE 802.1Qcc, IEEE 802.1Qcp, IEEE 802.1CS).

FIGS. 1-2 are block diagrams that respectively illustrate Centralized and Fully Centralized TSN configuration models, as specified in IEEE Std. 802.1Qbv-2015. Within a TSN network, the communication endpoints are called "Talker" and "Listener." All the switches and/or bridges between a Talker and a Listener must support certain TSN features, such as IEEE 802.1AS time synchronization. A "TSN domain" includes all nodes that are synchronized in the network, and TSN communication is only possible within such a TSN domain.

The communication between Talker and Listener is in streams. Each stream is based on data rate and latency requirements of an application implemented at both Talker and Listener. A Talker initializes a stream towards a Listener, and the TSN configuration and management features are used to set up the stream and to guarantee the stream's requirements across the network. Some TSN features require a central management entity called Centralized Network Configuration (CNC), as shown in FIG. 1. The CNC can use, for example, Netconf and YANG models to configure the switches in the network for each TSN stream. This also facilitates the use of time-gated queueing (defined in IEEE 802.1Qbv) that enables data transport in a TSN network with deterministic latency. With time-gated queueing on each switch, queues are opened or closed according to a precise schedule thereby allowing high-priority packets to pass through with minimum latency and jitter. Of course, packets must arrive at a switch ingress port before the gate is scheduled to be open.

The fully centralized model shown in FIG. 2 also includes a Centralized User Configuration (CUC) entity used as a point of contact for Listener and Talker. The CUC collects stream requirements and endpoint capabilities from the devices and communicates with the CNC directly. Further details about TSN configuration are given in IEEE 802.1Qcc.

Currently the fifth generation ("5G") of cellular systems, also referred to as New Radio (NR), is being standardized within the Third-Generation Partnership Project (3GPP). NR is developed for maximum flexibility to support many different use cases. These include mobile broadband, machine type communication (MTC), ultra-reliable low-latency communications (URLCC), device-to-device (D2D), and other use cases related to IIoT and/or Industry 4.0.

At a high level, the 5G network architecture consists of a Next Generation radio access network (NG-RAN) and a 5G core network (5GC). The NG-RAN includes various gNodeB's (gNBs, also referred to as base stations) serving cells by which wireless devices (also referred to as user equipment, or UEs) communicate. The gNBs can be connected to the 5GC via one or more NG interfaces and can be connected to each other via one or more Xn interfaces. Each gNB can support frequency division duplexing (FDD), time division duplexing (TDD), or a combination thereof.

FIG. 3 is a block diagram illustrating an exemplary division of the 5G network architecture into control plane (CP) and data (or user) plane (UP) functionality. For example, a UE can communicate data packets to a device and/or application on an external network (e.g., the Internet) by sending them via the NG-RAN (e.g., the serving gNB) to a user plane function (UPF) in the 5GC, which provides an interface from the 5GC to external networks.

CP functionality can operate cooperatively with the UP functionality. CP functions shown in FIG. 3 include an access management function (AMF), a session management function (SMF), a network exposure function (NEF), a policy control function (PCF), a network repository function (NRF), and a unified data management (UDM) function. The AMF can communicate with the RAN via an N2 logical interface, which can be carried over the NG interface from the gNB to the 5GC. Similarly, the UPF can communicate with the SMF via the N4 logical interface.

To support IIoT uses cases, a 5G network (e.g., NG-RAN and 5GC) should be capable of delivering highly accurate timing information from an external TSN network to TSN endpoints connected to the 5G network, e.g., via UEs. FIG. 4 is a block diagram illustrating an exemplary arrangement for interworking between the 5G network architecture shown in FIG. 3 and an exemplary fully centralized TSN network architecture. In the following discussion, a device connected to the 5G network is referred to as 5G endpoint, and a device connected to the TSN domain is referred to as TSN endpoint. The arrangement shown in FIG. 4 includes a Talker TSN endpoint and a Listener 5G endpoint connected to a UE. In other arrangements, a UE can instead be connected to a TSN network comprising at least one TSN bridge and at least one TSN endpoint. In this configuration, the UE can be part of a TSN-5G gateway.

The TSN can include a grandmaster clock (TSN GM) that serves as the definitive timing source for TSN endpoints. At a high level, the 5G network in FIG. 4 should appear to the connected TSN as a switch or bridge that delivers the TSN GM timing to the connected endpoints in compliance with the requirements in IEEE 802.1AS. However, the 5G network does not use the TSN GM as its own timing source, but instead relies on a 5G system clock (5GSC) that is distributed among the various network nodes or functions. As such, one or more timing relationships between TSN GM and 5GSC may need to be determined and/or derived to facilitate transit of the TSN GSM to the connected end station in a compliant manner.

At a high level, the time synchronization solution defined in 3GPP TS 23.501 only requires NG-RAN nodes (e.g., gNBs) to be synchronized to the 5G network reference time (i.e., based on 5GSC) while TSN GM timing is delivered to UEs and endpoints transparently through the 5G network using higher-layer generalized precision time protocol (gPTP) signaling. For 5GSC synchronization, a UE relies on its serving gNB providing reference time periodically, either via broadcast or unicast signaling. The nominal periodicity $T_n$ of gNB reference time delivery is left to network implementation. However, $T_n$ may reflect the UE clock stability and gNB clock stability in relation to the 5G GM clock used as the basis of the 5G reference time, etc.

For the most demanding applications, time errors introduced when relaying gPTP signaling between the TSN GM clock and a TSN end station can be as low as 1 microsecond (μs) in an 5G-TSN integrated network. 3GPP SA1 has defined 900 nanoseconds (ns) as the allowable error contribution from ingress to egress of 5G system within the 1-μs end-to-end requirement.

SUMMARY

For improved accuracy of TSN GM clock delivery and higher availability of end stations, the 5G system can be configured to support multiple UP paths, whereby two physical UEs and radio links are connected to same TSN end station. This means that TSN GM clock-related signaling to/from a given end-station is to be supported using two distinct QoS flows, with each QoS flow using the same gNB but different Data Radio Bearers (DRBs). As such, each UE is allocated its own QoS flow specific DRB.

Even so, the respective radio links of the redundant UEs are major contributions to the inaccuracies of time synchronization based on TSN GM clock delivery via gPTP signaling. Solutions to these problems are needed to support the most demanding applications having the 1-μs end-to-end requirement.

Embodiments of the present disclosure provide specific improvements to time-sensitive networking in a wireless environment, such as by facilitating solutions to overcome the exemplary problems summarized above and described in more detail below Some embodiments include methods (e.g., procedures) for a controller of a plurality of UEs that are served by a radio access network (RAN) node, according to various embodiments of the present disclosure.

These exemplary methods can include receiving information about the following from each of the plurality of UEs:

first measurements, $UE_{DL,Rx}$, of respective timing events of the radio link between the UE and the RAN node; and second measurements, $UE_{RxTxDiff}$, of respective time differences between the UE receiving a downlink (DL) reference signal (RS) and transmitting a corresponding uplink (UL) RS.

These exemplary methods can also include, based on the first measurements and the second measurements, selecting one of the plurality of UEs to provide the TSN end station with a TSN message timestamped by a system clock time that is associated with the RAN and that is based on at least one first measurement and at least one second measurement.

In some embodiments, the selecting operations can include determining which of the plurality of UEs has least variability in the first measurements and the second measurements and selecting the UE having least variability to provide the system clock time associated with the RAN to the TSN end station.

In some of these embodiments, for each of the UEs, the received information about the first measurements comprises a first variability of the first measurements and the received information about the second measurements comprises a second variability of the second measurements.

In other of these embodiments, for each of the UEs, the received information about the first measurements comprises a plurality of the first measurements and the received information about the second measurements comprises a plurality of the second measurements. In some variants, the plurality of the first measurements and the plurality of the second measurements are during a period since one of the UEs provided a most recent timestamped TSN message to the TSN end station. In such embodiments, the selecting operations can also include determining, for each of the UEs, a first variability of the plurality of the first measurements and a second variability of the plurality of the second measurements.

In various embodiments, each of the first and second variabilities is based on one of the following: difference between minimum and maximum of the corresponding plurality of measurements, or standard deviation of the corresponding plurality of measurements.

In some embodiments, the timing events on which the first measurements are based are ends of frames identified by respective system frame numbers (SFNs) in timing messages from the RAN node.

In some embodiments, these exemplary methods can also include sending, to the selected UE, an indication for the selected UE to provide the TSN end station with the message timestamped by the system clock time.

Other embodiments include methods (e.g., procedures) for a UE configured to operate in a RAN as one of a plurality of UEs coupled to a TSN end station.

These exemplary methods can include performing the following measurements:

first measurements, $UE_{DL,Rx}$, of respective timing events of the radio link between the UE and the RAN node; and second measurements, $UE_{RxTxDiff}$, of respective time differences between the UE receiving a DL RS and transmitting a corresponding UL RS.

These exemplary methods can also include sending information about the first measurements and information about the second measurements to a controller of the plurality of UEs. These exemplary method can also include, based on an indication received from the controller, providing the TSN end station with a TSN message timestamped by a system clock time that is associated with the RAN and that is based on at least one first measurement and at least one second measurement.

In some embodiments, the indication is received from the controller in response to sending the information about the first measurements and the information about the second measurements.

In some embodiments, the information about the first measurements comprises a plurality of the first measurements and the information about the second measurements comprises a plurality of the second measurements.

In other embodiments, these exemplary methods can also include determining a first variability of a plurality of the first measurements and a second variability of a plurality of the second measurements. In such embodiments, the information about the first measurements comprises the first variability and the information about the second measurements comprises the second variability. In some of these embodiments, each of the first and second variabilities is determined based on one of the following: difference between minimum and maximum of the corresponding plurality of measurements, or standard deviation of the corresponding plurality of measurements.

In some embodiments, the plurality of first measurements and the plurality of second measurements are performed during a period since providing a most recent timestamped message to the TSN end station.

In some embodiments, the timing events on which the first measurements are based are ends of frames identified by respective SFNs in timing messages from the network node.

In some embodiments, these exemplary methods can also include receiving, from the RAN node, an indication of a system clock time associated with the RAN; receiving, from the RAN node, a TSN message indicating a time associated with a grandmaster clock of the TSN; and timestamping the TSN message based on the following: the indicated system clock time, and at least one first measurement.

In some of these embodiments, these exemplary methods can also include sending the second measurements to the RAN node. In such case, the system clock time received from the network node is compensated for DL propagation delay (PD) based on at least one second measurement.

In other of these embodiments, these exemplary methods can also include receiving, from the network node, one or more third measurements, $gNB_{RxTxDiff}$, of respective time differences between the network node receiving an UL RS and transmitting a corresponding DL RS; and compensating the indicated system clock time for DL PD based on at least one second measurement and at least one third measurement. In such case, timestamping the TSN message is based on the compensated system clock time and the at least one first measurement.

Other embodiments include controllers (e.g., arranged as network nodes, UEs, or combinations thereof) and UEs configured to perform operations corresponding to any of the exemplary methods described herein. Other embodiments include non-transitory, computer-readable media storing program instructions that, when executed by processing circuitry, configure such controllers or UEs to perform operations corresponding to any of the exemplary methods described herein.

These and other embodiments can improve accuracy and/or reduce uncertainty of relationships between a 5GSC and a TSN GM, thereby facilitating compliance with end-to-end accuracy requirements for delivery of TSN time information from TSN GM clocks to remotely located end stations connected to a 5G network. This can be particularly beneficial for IIoT devices in a factory setting that may have strict accuracy requirements for which violation could result in harm to workers and/or factory operations.

These and other objects, features, and advantages of embodiments of the present disclosure will become apparent upon reading the following Detailed Description in view of the Drawings briefly summarized below.

BRIEF DESCRIPTION OF THE DRAWINGS

FIG. 8 shows a flow diagram illustrating an exemplary method (e.g., procedure) for a controller of a plurality of user equipment (UEs), according to various embodiments of the present disclosure.

FIG. 9 shows a flow diagram illustrating an exemplary method (e.g., procedure) for a UE (e.g., wireless device), according to various embodiments of the present disclosure.

DETAILED DESCRIPTION

Figure 1:
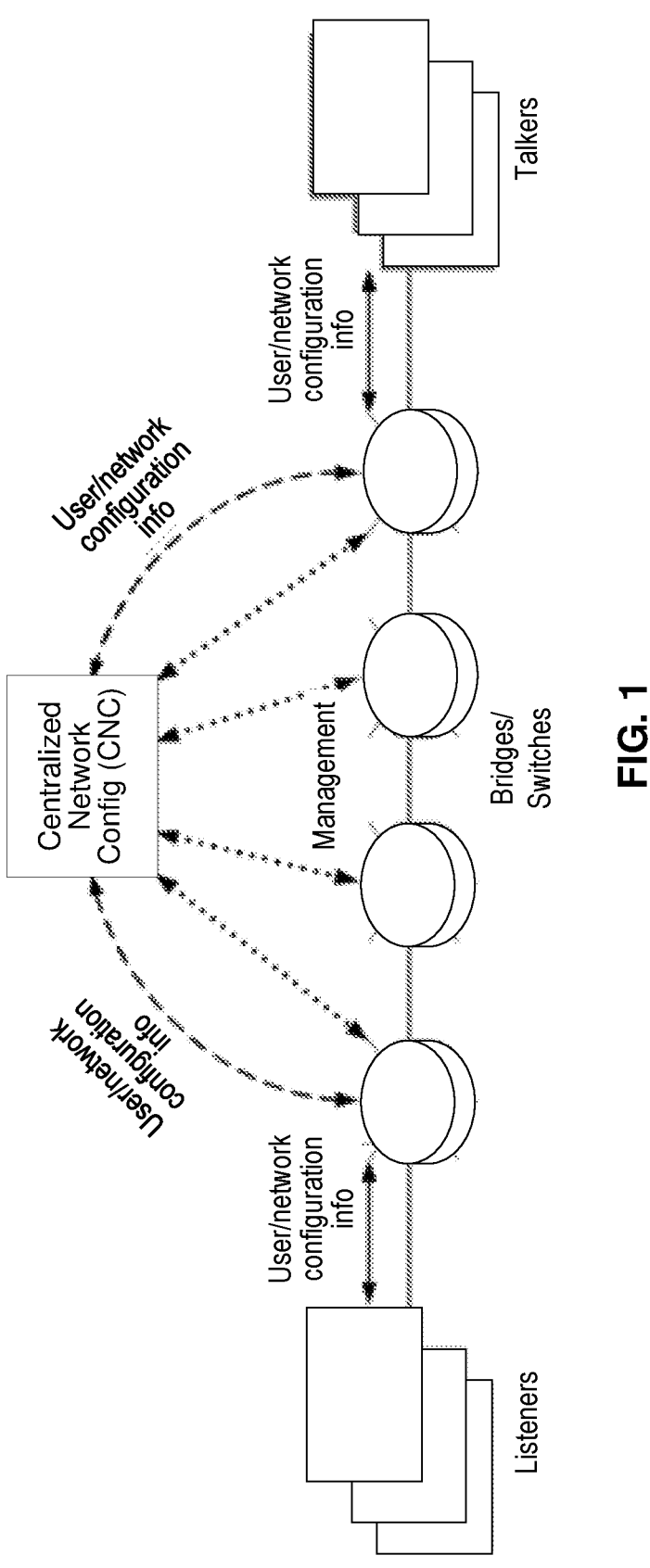
FIG. 1 is a block diagram illustrating a Centralized Time-Sensitive Networking (TSN) configuration model, as specified in IEEE 802.1Qbv-2015.
Figure 2:
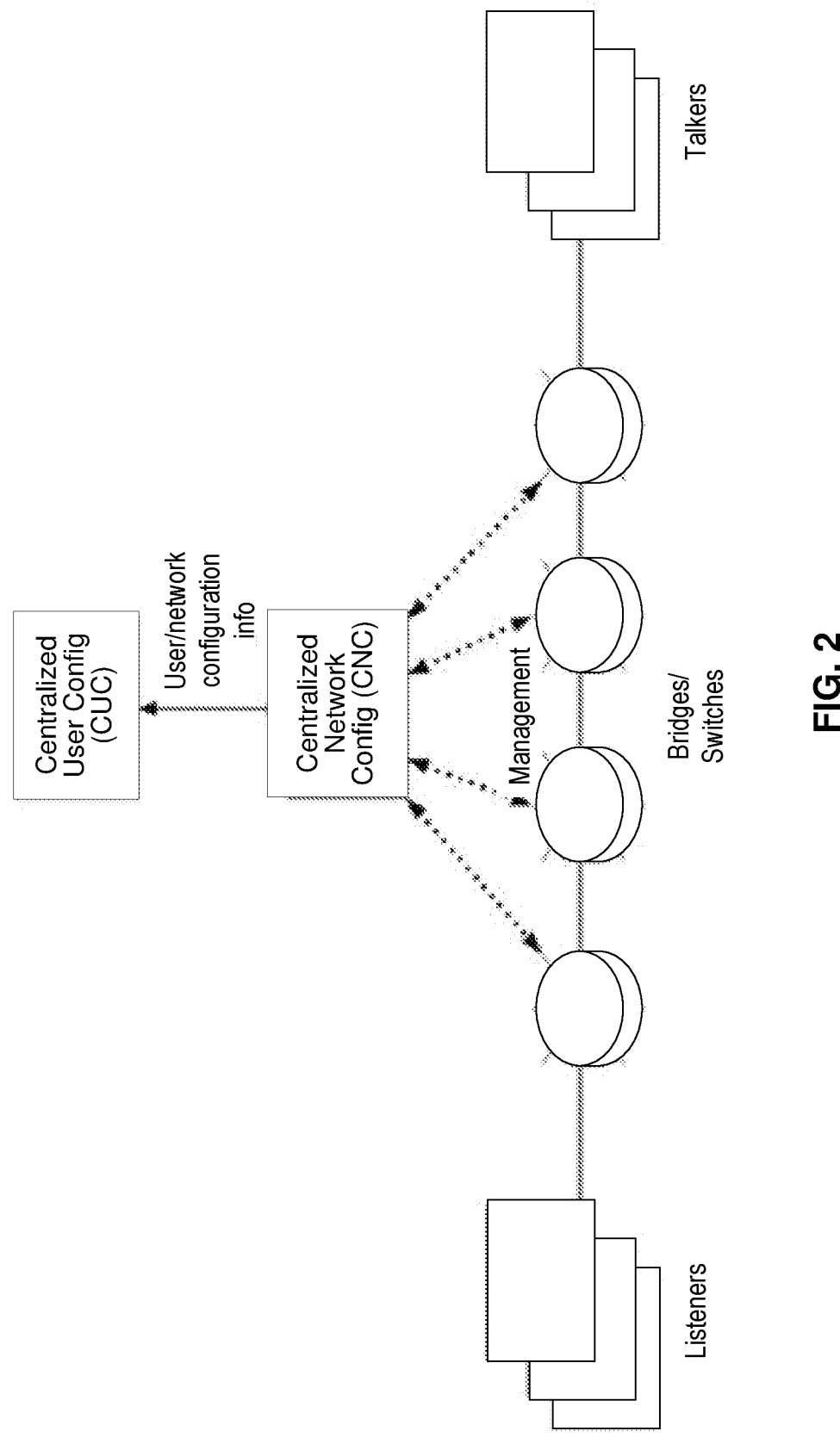
FIG. 2 is a block diagram illustrating a Fully Centralized TSN configuration model, as specified in IEEE 802.1Qbv-2015.
Figures 3, 4:
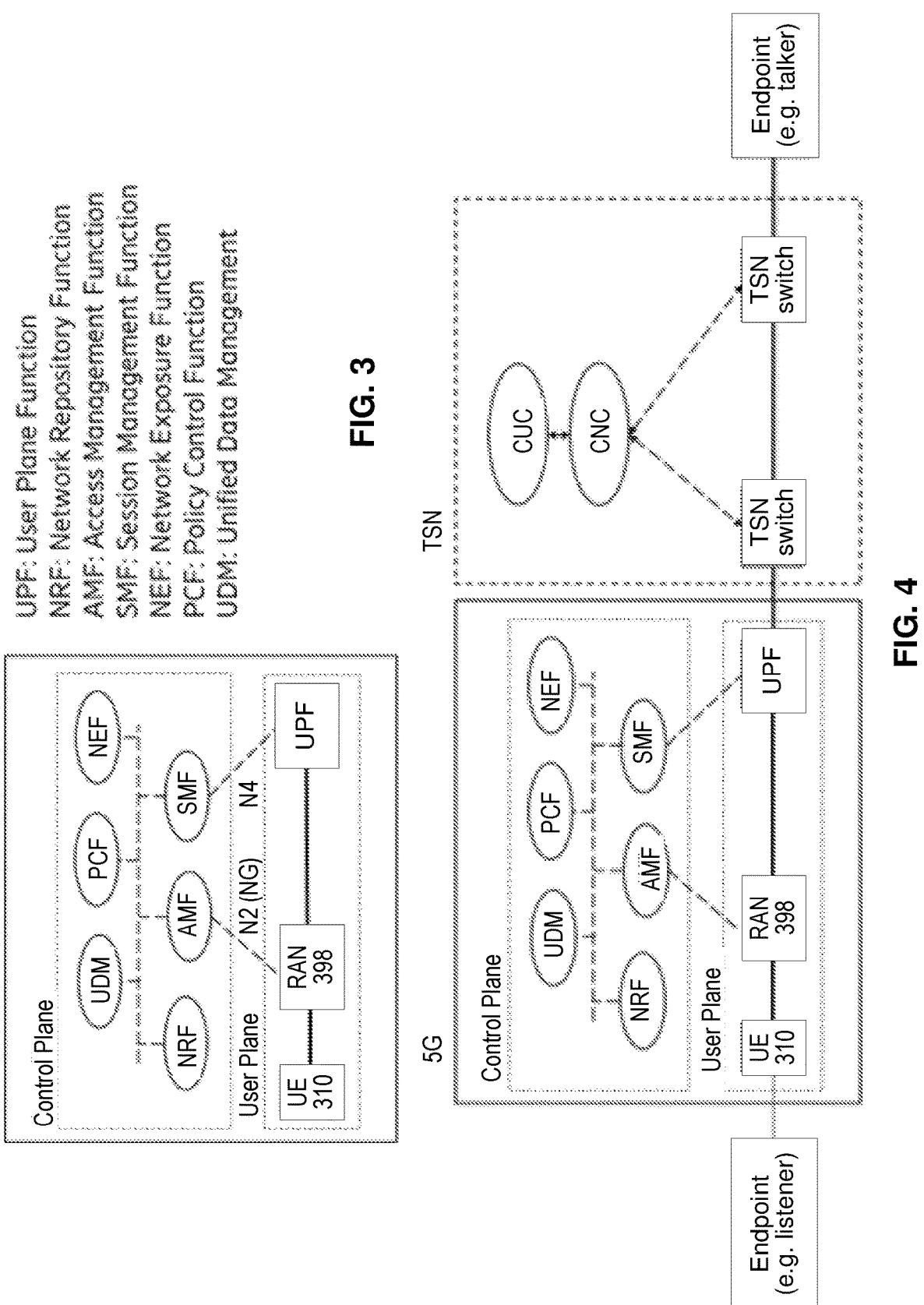
FIG. 3 is a block diagram illustrating an exemplary control plane (CP) and a data (or user) plane (UP) architecture of an exemplary 5G wireless network.
FIG. 4 is a block diagram illustrating an exemplary arrangement for interworking between the 5G network architecture shown in FIG. 3 and an exemplary fully centralized TSN network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, the respective radio links of the redundant UEs are major contributions to the inaccuracies of time synchronization based on TSN GM clock delivery via gPTP signaling This is discussed in more detail below after the following discussion of TSN GM clock delivery via 5G.

Figure 5:
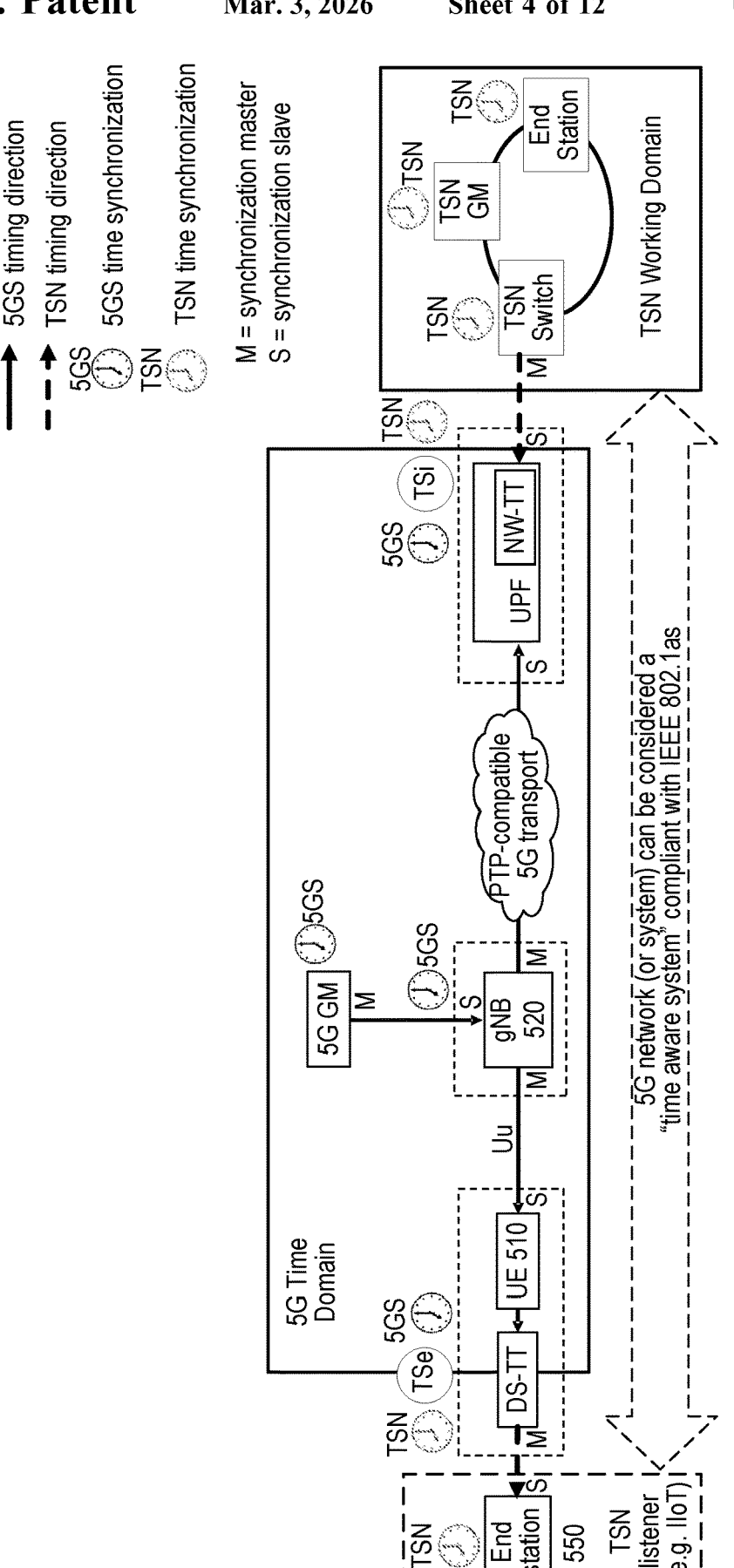
FIG. 5 is a high-level block diagram of an exemplary arrangement in which a 5G network delivers timing references from a time-sensitive network (TSN) to TSN end stations connected to the 5G network, according to various embodiments of the present disclosure.

FIG. 5 is a high-level block diagram of an exemplary arrangement in which a 5G network delivers timing references from a TSN network to TSN end stations connected to the 5G network. The TSN source network is shown as a TSN Working Domain that includes a TSN GM, an end station, and a TSN Switch. In this exemplary arrangement, the 5G network is integrated with the external TSN network as a TSN bridge, such as shown in other figures described above. Furthermore, in this arrangement, the 5G network can be modelled as an IEEE 802.1AS compliant entity; for TSN synchronization, the end-to-end 5G network can be considered as an IEEE 802.1AS "time-aware system".

However, only the TSN Translators (TTs) at the edges of the 5G network need to support the IEEE 802.1AS operations. This includes a network side TSN translator (NW-TT) at the user plane function (UPF) and a device-side TSN translator (DS-TT) at the UE. Ingress timestamping ("TSi") is performed by the NW-TT when an external TSN clock (e.g., timing) signal is received from the TSN Working Domain. Likewise, egress timestamping ("TSe") is performed by the DS-TT when that TSN clock signal arrives at a UE and is forwarded to the DS-TT. In addition to ingress and egress timestamping, the TTs can support other 802.1AS functions such as generalized precision time protocol (gPTP), Best Master Clock Algorithm (BMCA), rateRatio, etc.

More specifically, upon reception of a downlink gPTP message, the NW-TT makes an ingress timestamp (TSi) for each gPTP event (Sync) message. The UPF then forwards the gPTP message from TSN network to the UEs via all UPF-terminated PDU sessions that the UEs have established to the TSN network. All gPTP messages are transmitted on a quality of service (QoS) flow that complies with the residence time upper bound requirement specified in IEEE 802.1AS. The UE receives the gPTP messages and forwards them to the DS-TT. The DS-TT then makes an egress timestamp (TSe) for the gPTP event (Sync) messages for the TSN domain (e.g., endpoints).

The difference between TSi and TSe reflects the residence time of the gPTP message within the 5G network, expressed in 5GSC time. Put differently, if gPTP message indicating TSN time "X" is stamped with 5G system clock (5GSC) time "Y" at ingress and 5GSC time "Z" at egress, the end stations can adjust TSN time "X" delivered to the end station by the residence time Z-Y. More specifically, the DS-TT calculates and adds the measured residence time between the TTs into the Correction Field (CF) of each gPTP event (Sync) message. As such, the relative accuracy of the 5GSC measured between ingress and egress is essential for accurate TSN GM clock timing information delivered over 5G networks.

In the 5G network, the UE, the gNB, the UPF, the NW-TT, and the DS-TT are synchronized with a grandmaster 5GSC ("5G GM" in FIG. 5), either directly or indirectly. In general, the 5GSC is made available to all UP nodes in the 5G network via a PTP-compatible transport network. Likewise, 5GSC is made available to UEs via signaling of absolute timing of radio frames. In FIG. 5, solid lines are used to denote flow of 5GSC synchronization between respective synchronization master ("M") and slave ("S") elements in the 5G network. Likewise, dashed lines are used to denote flow of TSN GM synchronization between respective synchronization master ("M") and slave ("S") elements in the TSN domain. In general, the two synchronization processes can be independent from each other and the gNB only needs to be synchronized to the 5GSC.

The timestamping is based on the 5G system clock and the accuracy of delivering this clock to a UE is improved by allowing the propagation delay (PD) experienced when sending a TSN (e.g., gPTP) message from a gNB to a UE to be more precisely determined. Such improvements can be beneficial, particularly in view of additional inaccuracies that can occur during UE distribution of TSN clock to IIoT end stations to enable TSN functionalities such as Time-Aware Scheduling of IIoT device operations in the working domain.

The 3GPP Timing Advance command (see 3GPP TS 38.133) is used for UE uplink transmission synchronization. This may be needed due to changes in the UE propagation environment and/or propagation distance between the UE and the serving base station (e.g., gNB). At connection setup, an absolute timing correction is communicated to a UE using a medium access control (MAC) random access response (RAR) element. After connection setup, a relative timing correction can be sent to a UE using a MAC control element (CE).

As briefly mentioned above, the most demanding industrial applications for example in an integrated 5G-TSN network can have a time error budget as low as 900-ns between the 5G ingress and egress points used for relaying TSN GM clocks.

The radio interface (gNB antenna—UE antenna) synchronization error represents a portion of this 5G ingress to egress synchronicity budget and consists of the uncertainty introduced when (a) sending the 5G reference time from gNB antenna to the UE antenna by including Reference-TimeInfo in either a DLInformationTransfer RRC message or SI block 9 (SIB9) ($Err_{BS,DL,Tx}+Err_{UE,DL,Rx}$) and then (b) adjusting the 5G reference time to reflect the DL PD. The total error is given by the following equation:

$$\text{Total Error} = Err_{BS,DL,Tx} + Err_{UE,DL,Rx} + PDerror \qquad (1)$$

Embodiments of the present disclosure facilitate reduction of errors related to different UE implementations, particularly errors when determining the end of the system frame number (SFN) to which the indicated 5G reference time applies (e.g., $Err_{UE,DL,Rx}$) and errors when determining the $UE_{RxTx}$ time difference, i.e., $Err_{UE,RxTxDiff}$ component of PDerror.

Figure 6:
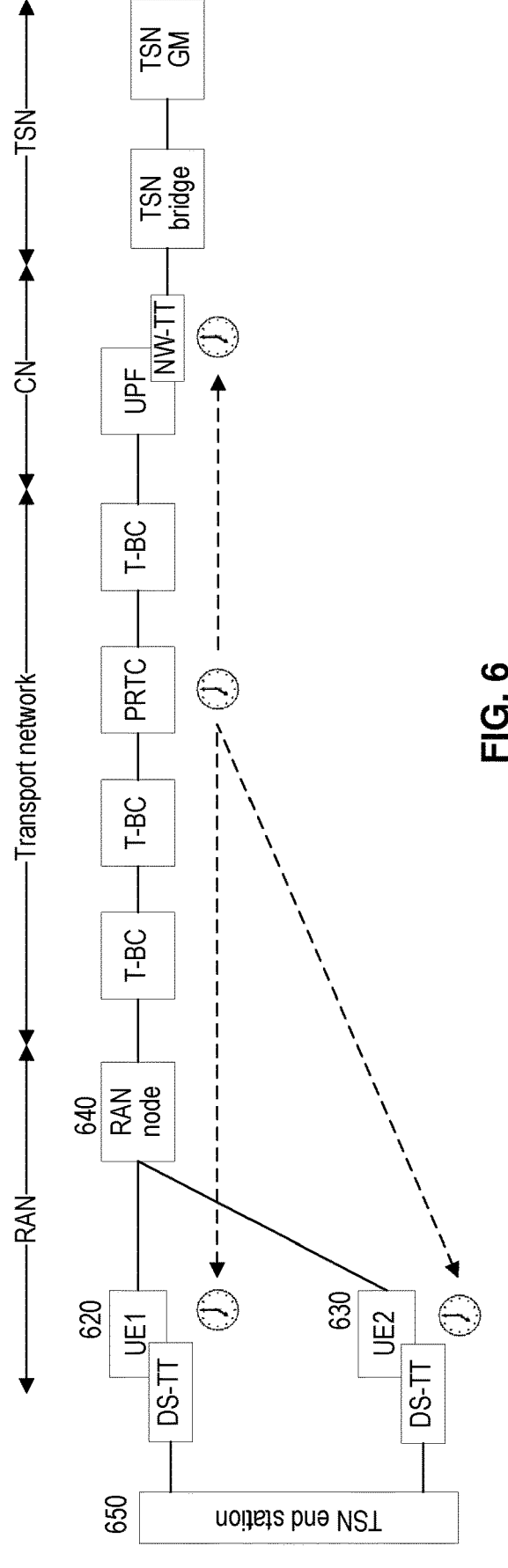
FIG. 6 shows an exemplary arrangement in which a TSN end station is connected to redundant UEs, according to various embodiments of the present disclosure.

FIG. 6 shows a redundant UE deployment scenario that illustrates various embodiments of the present disclosure. In FIG. 6, a TSN end station is equipped with two redundant UEs, e.g., to improve accuracy of TSN GM clock delivery and/or end station availability. The 5G time reference is delivered via two instances of RRC signaling over the respective radio links between the gNB and the two redundant UEs. The gNB is connected to the UPF in the 5GC via PTP-compatible transport, such as shown in FIG. 5. The UPF can include the network side TSN translator (NW-TT, as shown in FIG. 5), which is connected to the TSN GM via a TSN bridge.

However, the gNB is not necessarily aware of the two UEs being attached to the same TSN end station. Rather, it is sufficient for the UPF and a UE-side controller to know when two distinct QoS flows associated with the respective UEs are used to send gPTP signaling for the TSN GM clock to the TSN end station connected to both UEs. In other words, the UPF will be configured to deliver TSN GM clock information via gPTP using UE-specific QoS flows. For example, this can be done for end stations requiring more demanding TSN GM clock accuracy or increased availability. For this configuration there will be one instance of RRC signaling used for sending 5G reference time information for each UE.

The gNB, under conventional operation, will be aware of the UE-specific QoS flows used for the gPTP signaling. It can be assumed that a Round-Trip Time (RTT)-based PD compensation method is used to minimize PDerror introduced when adjusting the 5G reference time transmitted from the 5G GM (source of the 5G reference time) towards both the UEs to take into account respective DL PDs.

One RTT-based DL PD compensation method involves the UE (or gNB) summing the TA value indicated by the initial absolute TA value and all subsequent relative TA values, and taking some portion of the resulting total TA value to represent DL-only PD. For example, 50% could be used assuming the downlink and uplink propagation delays are essentially the same. The estimated PD can then be used to understand time synchronization dynamics, e.g., for accurately tracking and/or compensating the value of a 5GSC at the UE side relative to the value of that clock in some other network node.

Another RTT-based DL PD compensation method involves the UE computing a UE Tx-Rx time difference and the gNB computing a gNB Rx-Tx time difference. The UE and gNB can estimate the respective RX times based on tracking DL and UL transmissions (e.g., reference signals) by the opposite entity. The UE and gNB can exchange these values. The estimated DL PD can then be determined according to [(gNB Rx-Tx)–(UE Tx-Rx)]/2. This technique can substantially reduce the uncertainty of the estimated DL PD compared to the other RTT-based method discussed above.

Using the arrangement shown in FIG. 6 as an illustrative context, embodiments include a reference time delivery method that can facilitate reduction and/or minimization of errors or uncertainty in the end of the system frame number (SFN) to which the indicated 5G reference time applies (e.g., $Err_{UE,DL,Rx}$) and errors or uncertainty in the determined $UE_{RxTx}$ time difference, i.e., $Err_{UE,RxTxDiff}$ component of PDerror.

In some embodiments, the gNB maintains the acquired 5G reference time on an ongoing basis as well as periodically projecting the 5G reference time to subsequent timing events in the system frame structure (e.g., end of SFNz) at the gNB antenna reference point. The gNB the transmits a message (e.g., SIB broadcast or RRC unicast) containing the projected 5G reference time value and the timing event (e.g., value of SFNz) to which it applies. In some embodiments, this message can also include an indication, value, and/or representation of the error (or uncertainty) in the included 5G reference time value at the timing event. In particular, the indicated error can be due to the above-mentioned $Err_{UE,DL,Rx}$ and $Err_{UE,RxTxDiff}$ components.

For RTT-based DL PD compensation methods, the total error can be estimated based on the following equations:

$$PDerror = Err_{gNB,RxTxDiff} + Err_{UE,RxTxDiff} + Err_{RxTxDiff,report} \quad (2)$$

$$\text{Total Error} = Err_{BS,DL,Tx} + Err_{UE,DL,Rx} + PDerror \quad (3)$$

where:
PDerror refers to the time error experienced during estimation of the DL PD and therefore during the subsequent adjustment of the 5G reference time to reflect DL PD;

$Err_{gNB,RxTxDiff}$, $Err_{UE,RxTxDiff}$ refer to the measurement accuracy of estimated difference between transmission and reception of reference signals at gNB and UE; and $Err_{RxTxDiff,report}$ refers to time error due to granularity of reported UE Rx-Tx difference.

For the exemplary arrangement shown in FIG. 6, the two UEs attached to same industrial TSN end station will have radio links that different in some manner even though they are with the same gNB. As such, the two UEs may experience different error/uncertainty performance for any given TSN GM clock information delivered over these links. This can be due to different multipath propagation experienced by the two UEs, which results in detecting a radio link timing event (e.g., end of SFNz) at different times. In other words, the two UEs will consider the corresponding projected 5G reference time value to occur at different times, such that the two UEs will have different $Err_{UE,DL,Rx}$. This can also be due to different UE software/hardware implementations for detection of DL RS and transmission of a corresponding UL RS used for determining the $UE_{RxTx}$ time difference. As such, the two UEs can have different $Err_{UE,RxTxDiff}$. On the other hand, values for $Err_{BS,DL,Tx}$, $Err_{BS,RxTxDiff}$ and $Err_{RxTxDiff,report}$ in equations 2-3 above can be assumed to be the same for both UEs.

In some embodiments, each UE can monitor the stability of its UE-specific measurements $UE_{DL,Rx}$ and $UE_{RxTxDiff}$ for a particular duration or cycle time. The cycle time for monitoring these measurements can be based on the frequency of gPTP signaling over the UP. In such embodiments, a function (or UE controller) associated with the TSN end station can identify which of the radio links has least varying UE-specific measurements $UE_{DL,Rx}$ and $UE_{RxTxDiff}$. For example, "least varying" can be lowest peak-to-peak (i.e., minimum value to maximum value) for these UE-specific measurements by the respective UEs. The least varying criterion results in lowest values for corresponding error components $Err_{UE,DL,Rx}$ and $Err_{UE,RxTxDiff}$. Other statistical criteria, such as standard deviation, can also be used.

In some variants, the UE controller can be in of the UEs. In other variants, the UE controller can be in the gNB. In other variants, the UE controller can be an entity that is associated with the TSN end station and that can communicate with both UEs.

The 5G reference time provided to a UE and adjusted to reflect DL PD can then be used for the timestamping for the control-to-control use case or to provide the accurate time reference towards the TSN end station.

Figure 7:
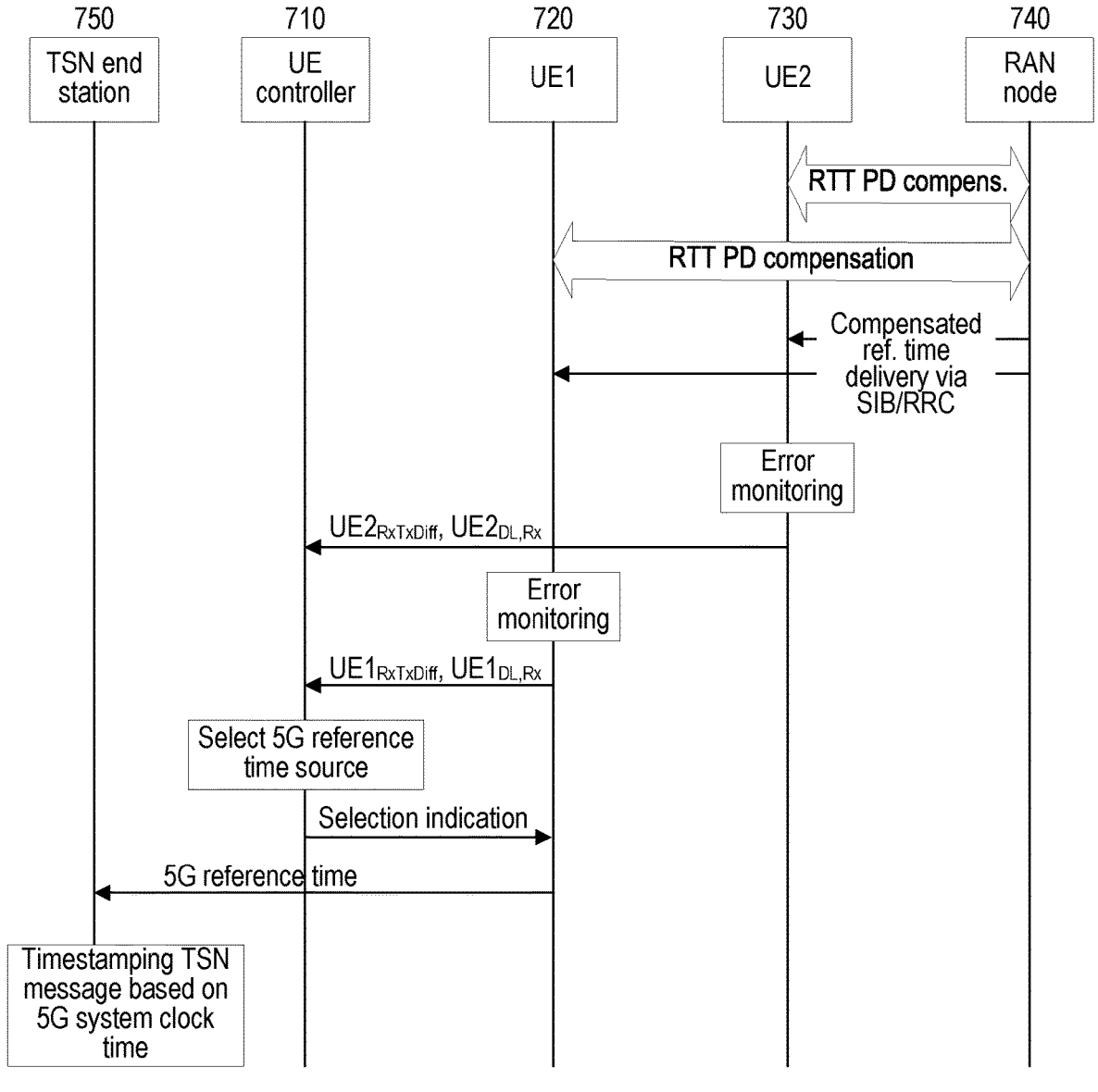
FIG. 7 shows a signaling flow between a gNB, a UE controller, and two redundant UEs connected to a TSN end station, according to various embodiments of the present disclosure.

FIG. 7 shows a signaling flow diagram between a gNB, two redundant UEs (UE1 and UE2) connected to a TSN end station, according to various embodiments of the present disclosure. Additionally, FIG. 7 shows the UE controller mentioned above.

Initially, UE1 and UE2 perform respective RTT-based DL PD compensation methods with the gNB, which subsequently transmits one or more messages including a projected 5G reference time value and the timing event (e.g., end of SFNz) to which it applies. For example, the gNB can broadcast a single message in a SIB or transmit two RRC unicast messages to the respective UEs. Each UE then monitors the stability of their respective UE-specific measurements $UE_{DL,Rx}$ and $UE_{RxTxDiff}$ for a particular duration or cycle time. The cycle time for monitoring these measurements can be based on the frequency of gPTP signaling.

The UEs send the UE controller their respective values for $UE_{DL,Rx}$ and $UE_{RxTxDiff}$, or alternately the respective variations of these measurements over a cycle time. In either case, the UE controller identifies which of the radio links has the least varying values for $UE_{DL,Rx}$ and $UE_{RxTxDiff}$ and, thus, the radio link having the smallest $Err_{UE,DL,Rx}$ and $Err_{UE,RxTxDiff}$. The UE controller can then select the UE having the least varying values as the 5G reference time source for the TSN end-station. The UE controller notifies the selected UE, which provides the TSN end-station a 5G reference time to use for TSN egress timestamping of gPTP messages. Two uses cases that further illustrates these operations are described below.

In a first use case, the gNB sends UEs the 5G reference time adjusted to reflect DL PD. As such, the gNB determines the DL PD and adjusts the 5G reference time accordingly. Each UE sends the gNB an indication of the time difference $UE_{RxTxDiff}$ it measured between the DL RS and the corresponding UL RS, which the gNB uses for DL PD compensation.

In a second use case, the gNB sends UEs the 5G reference time without adjustment to reflect DL PD. In other words, each UE is responsible for determining DL PD and adjusting the received 5G reference time accordingly. The gNB also sends each UE an indication of the time difference $gNB_{RxTxDiff}$ that the gNB measured between the UL RS and the corresponding DL RS for each UE, which the respective UEs use for DL PD compensation.

In either use case, the UE controller is aware of which UE has least varying UE-specific measurements $UE_{DL,Rx}$ and $UE_{RxTxDiff}$ and corresponding lowest value for corresponding error components $Err_{UE,DL,Rx}$ and $Err_{UE,RxTxDiff}$. Once the UE controller determines which of the UE- or gNB-adjusted 5G reference time values is least varying, it transmits it towards TSN end station or causes the selected UE to transmit towards the TSN end station. In this manner, the UE controller ensures the adjusted 5G reference time for that UE is used for ingress/egress timestamping needed for measuring 5G residence time of TSN GM clocks.

In a variant, the UE controller averages the UE-determined values corresponding to $UE_{DL,Rx}$, the measured reference time value of the timing event (e.g., end of SFNz) indicated by the time reference message from the gNB. Additionally, the UE controller averages the UE-determined values of $UE_{RxTxDiff}$. This results in corresponding average (i.e., non UE-specific) values for errors $Err_{UE,DL,Rx}$ and $Err_{UE,RxTxDiff}$. The UE controller can then provide to the TSN end-station a 5G reference time value compensated based on averaged $UE_{DL,Rx}$ and averaged $UE_{RxTxDiff}$.

In this manner, embodiments of the present disclosure can reduce timing error introduced by the radio link between gNB and UE when the 5GS is used to deliver gPTP signaling for a TSN, particularly when redundant UEs are deployed with a single TSN end station. More specifically, embodiments facilitate more accurate DL PD compensation for the radio links of the respective UE. This can increase the timing accuracy of TSN (e.g., gPTP) signaling between a TSN GM clock and a TSN end station, as well the availability of such end stations. Embodiments can be particularly beneficial for IIoT applications having end-to-end timing accuracy requirements of 1 µs or less.

These embodiments described above can be further illustrated by FIGS. 8-9, which depict exemplary methods (e.g., procedures) for a controller and a UE, respectively. Put differently, various features of the operations described below correspond to various embodiments described above. The exemplary methods shown in FIGS. 8-9 can be used cooperatively to provide various benefits, advantages, and/or solutions to problems described herein. Although the exemplary methods are illustrated in FIGS. 8-9 by specific blocks in particular orders, the operations corresponding to the blocks can be performed in different orders than shown and can be combined and/or divided into blocks having different functionality than shown. Optional blocks and/or operations are indicated by dashed lines.

In particular, FIG. 8 illustrates an exemplary method (e.g., procedure) for a controller of a plurality of UEs that are served by a RAN node, according to various embodiments of the present disclosure. The exemplary method can be performed by a controller coupled to the plurality of UEs and to a TSN end station, such as shown in FIG. 7. Moreover, the controller can be arranged as a network node, a UE, a UE hub, or a combination thereof, such as network nodes, UEs, or UE hubs that are described elsewhere herein.

The exemplary method can include the operations of block 810, in which the controller can receive information about the following from each of the plurality of UEs:

first measurements, $UE_{DL,Rx}$, of respective timing events of the radio link between the UE and the RAN node; and second measurements, $UE_{RxTxDiff}$, of respective time differences between the UE receiving a downlink (DL) reference signal (RS) and transmitting a corresponding uplink (UL) RS.

The exemplary method can also include the operations of block 820, where based on the received information, the controller can select one of the plurality of UEs to provide the TSN end station with a TSN message (e.g., gPTP message) timestamped by a system clock time that is associated with the RAN and that is based on at least one first measurement and at least one second measurement.

In some embodiments, the selecting operations in block 820 can include the operations of sub-blocks 822-823, where the controller can determine which of the plurality of UEs has least variability in the first measurements and the second measurements and select the UE having least variability to provide the system clock time associated with the RAN to the TSN end station.

In some of these embodiments, for each of the UEs, the received information about the first measurements comprises a first variability of the first measurements and the received information about the second measurements comprises a second variability of the second measurements.

In other of these embodiments, for each of the UEs, the received information about the first measurements comprises a plurality of the first measurements and the received information about the second measurements comprises a plurality of the second measurements. In some variants, the plurality of the first measurements and the plurality of the second measurements are during a period since one of the UEs provided a most recent timestamped TSN message to the TSN end station. In such embodiments, the selecting operations in block 820 can also include the operations of sub-block 821, where the controller can determine, for each of the UEs, a first variability of the plurality of the first measurements and a second variability of the plurality of the second measurements. The operations in sub-blocks 822-823 can be based on these determined variabilities.

In various embodiments, each of the first and second variabilities is based on one of the following: difference between minimum and maximum of the corresponding plurality of measurements, or standard deviation of the corresponding plurality of measurements.

In some embodiments, the timing events on which the first measurements are based are ends of frames identified by respective system frame numbers (SFNs) in timing messages from the RAN node.

In some embodiments, the exemplary method can also include the operations of block 830, in which the controller can send, to the selected UE (e.g., selected in block 820), an indication for the selected UE to provide the TSN end station with a TSN message (e.g., gPTP message) timestamped by the system clock time. This arrangement is illustrated in FIG. 7.

In addition, FIG. 9 illustrates an exemplary method (e.g., procedure) for a UE configured to operate in a RAN as one of a plurality of UEs coupled to a TSN end station, according to various embodiments of the present disclosure. For example, the exemplary method shown in FIG. 9 can be implemented in a UE (e.g., wireless device) described elsewhere herein.

The exemplary method can include the operations of block 910, in which the UE can perform the following measurements:

first measurements, $UE_{DL,Rx}$, of respective timing events of the radio link between the UE and the RAN node; and second measurements, $UE_{RxTxDiff}$, of respective time differences between the UE receiving a DL RS and transmitting a corresponding UL RS.

The exemplary method can also include the operations of block 930, in which the UE can send information about the first measurements and information about the second measurements to a controller of the plurality of UEs. The exemplary method can also include the operations of block 995, where based on an indication received from the controller, the UE can provide the TSN end station with a TSN message (e.g., gPTP message) timestamped by a system clock time that is associated with the RAN and that is based on at least one first measurement and at least one second measurement.

In some embodiments, the indication is received from the controller in response to sending the information about the first measurements and the information about the second measurements.

In some embodiments, the information about the first measurements comprises a plurality of the first measurements and the information about the second measurements comprises a plurality of the second measurements.

In other embodiments, the exemplary method can also include the operations of block 920, where the UE can determine a first variability of a plurality of the first measurements and a second variability of a plurality of the second measurements. In such embodiments, the information about the first measurements comprises the first variability and the information about the second measurements comprises the second variability. In some of these embodiments, each of the first and second variabilities is determined based on one of the following: difference between minimum and maximum of the corresponding plurality of measurements, or standard deviation of the corresponding plurality of measurements.

In some embodiments, the plurality of first measurements and the plurality of second measurements are performed during a period since providing a most recent timestamped TSN message to the TSN end station.

In some embodiments, the timing events on which the first measurements are based are ends of frames identified by respective SFNs in timing messages from the network node.

In some embodiments, the exemplary method can also include the operations of blocks 960, 970, and 990. In block 960, the UE can receive, from the RAN node, an indication of a system clock time associated with the RAN. In block 970, the UE can receive the TSN message from the RAN node, wherein the TSN message indicates a time associated with a grandmaster clock of the TSN (TSN GM). In block 990, the UE can timestamp the TSN message based on the indicated system clock time and at least one first measurement.

In some of these embodiments, the exemplary method can also include the operations of blocks 940, where the UE can send the second measurements to the RAN node. In such case, the system clock time received from the RAN node (e.g., in block 960) is compensated for DL PD based on at least one second measurement.

In other of these embodiments, the exemplary method can also include the operations of blocks 950 and 980. In block 950, the UE can receive, from the RAN node, one or more third measurements, $gNB_{RxTxDiff}$, of respective time differences between the RAN node receiving an UL RS and transmitting a corresponding DL RS. In block 990, the UE can compensate the indicated system clock time for DL PD based on at least one second measurement and at least one third measurement. In such case, timestamping the TSN message (e.g., in block 990) is based on the compensated system clock time and the at least one first measurement.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 10:
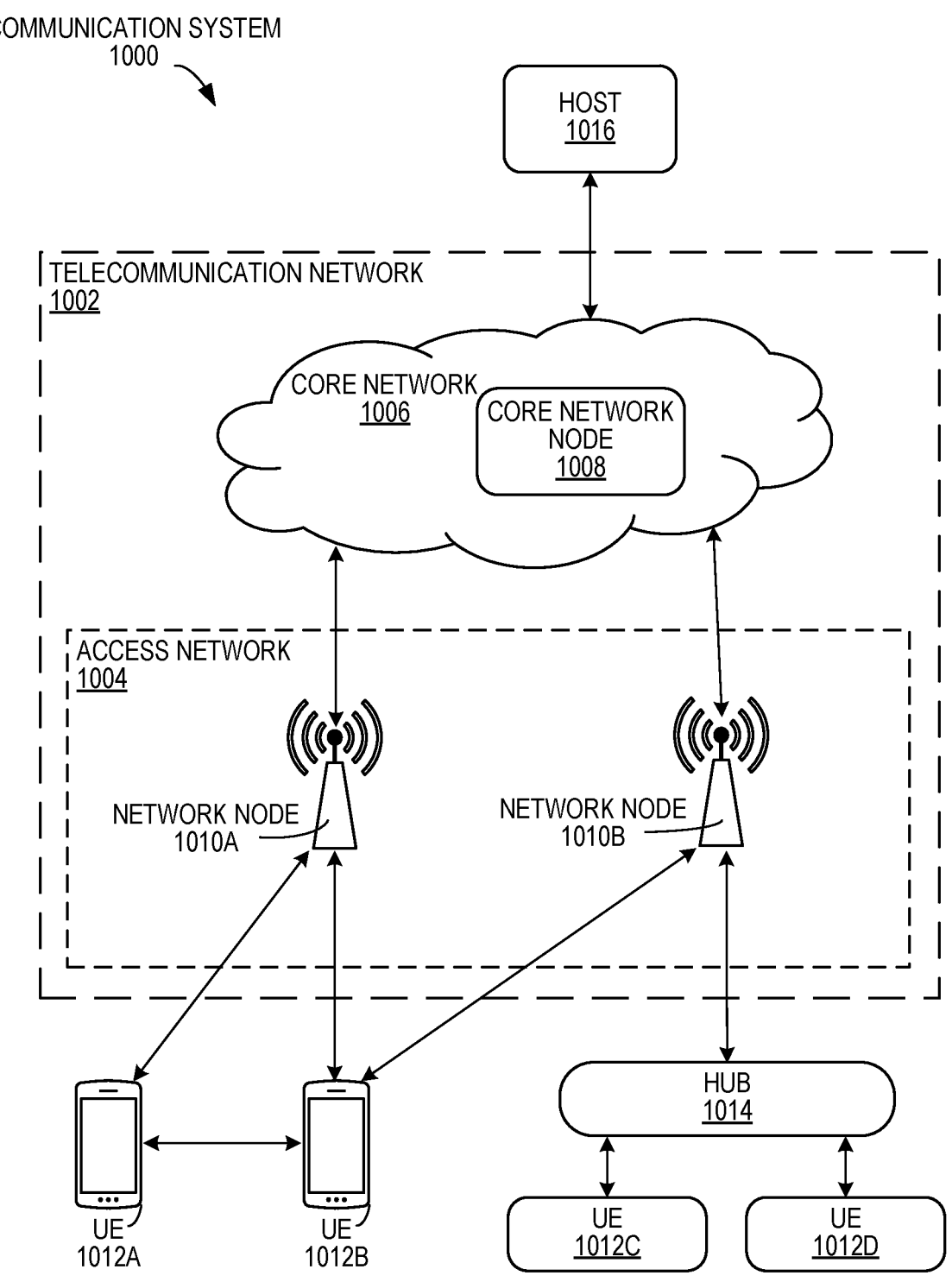
FIG. 10 shows a communication system according to various embodiments of the present disclosure.

FIG. 10 shows an example of a communication system 1000 in accordance with some embodiments. In this example, the communication system 1000 includes a telecommunication network 1002 that includes an access network 1004, such as a radio access network (RAN), and a core network 1006, which includes one or more core network nodes 1008. The access network 1004 includes one or more access network nodes, such as network nodes 1010a and 1010b (one or more of which may be generally referred to as network nodes 1010), or any other similar 3$^{rd}$ Generation Partnership Project (3GPP) access node or non-3GPP access point. The network nodes 1010 facilitate direct or indirect connection of user equipment (UE), such as by connecting UEs 1012a, 1012b, 1012c, and 1012d (one or more of which may be generally referred to as UEs 1012) to the core network 1006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1000 may include any number of wired or wireless networks, network nodes, UEs, and/or any other components or systems that may facilitate or participate in the communication of data and/or signals whether via wired or wireless connections. The communication system 1000 may include and/or interface with any type of communication, telecommunication, data, cellular, radio network, and/or other similar type of system.

The UEs 1012 may be any of a wide variety of communication devices, including wireless devices arranged, configured, and/or operable to communicate wirelessly with the network nodes 1010 and other communication devices. Similarly, the network nodes 1010 are arranged, capable, configured, and/or operable to communicate directly or indirectly with the UEs 1012 and/or with other network nodes or equipment in the telecommunication network 1002 to enable and/or provide network access, such as wireless network access, and/or to perform other functions, such as administration in the telecommunication network 1002.

In the depicted example, the core network 1006 connects the network nodes 1010 to one or more hosts, such as host 1016. These connections may be direct or indirect via one or more intermediary networks or devices. In other examples, network nodes may be directly coupled to hosts. The core network 1006 includes one more core network nodes (e.g., core network node 1008) that are structured with hardware and software components. Features of these components may be substantially similar to those described with respect to the UEs, network nodes, and/or hosts, such that the descriptions thereof are generally applicable to the corresponding components of the core network node 1008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1016 may be under the ownership or control of a service provider other than an operator or provider of the access network 1004 and/or the telecommunication network 1002 and may be operated by the service provider or on behalf of the service provider. The host 1016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1000 of FIG. 10 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1002 is a cellular network that implements 3GPP standardized features. Accordingly, the telecommunications network 1002 may support network slicing to provide different logical networks to different devices that are connected to the telecommunication network 1002. For example, the telecommunications network 1002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1012 are configured to transmit and/or receive information without direct human interaction. For instance, a UE may be designed to transmit information to the access network 1004 on a predetermined schedule, when triggered by an internal or external event, or in response to requests from the access network 1004. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1014 communicates with the access network 1004 to facilitate indirect communication between one or more UEs (e.g., UE 1012*c* and/or 1012*d*) and network nodes (e.g., network node 1010*b*). In some examples, the hub 1014 may be a controller, router, content source and analytics, or any of the other communication devices described herein regarding UEs. For example, the hub 1014 may be a broadband router enabling access to the core network 1006 for the UEs. As another example, the hub 1014 may be a controller that sends commands or instructions to the UEs and/or to any equipment included therein or coupled thereto. Commands or instructions may be received from the UEs, network nodes 1010, or by executable code, script, process, or other instructions in the hub 1014. As another example, the hub 1014 may be a data collector that acts as temporary storage for UE data and, in some embodiments, may perform analysis or other processing of the data. As another example, the hub 1014 may be a content source. For example, for a UE that is a VR headset, display, loudspeaker or other media delivery device, the hub 1014 may retrieve VR assets, video, audio, or other media or data related to sensory information via a network node, which the hub 1014 then provides to the UE either directly, after performing local processing, and/or after adding additional local content. In still another example, the hub 1014 acts as a proxy server or orchestrator for the UEs, in particular in if one or more of the UEs are low energy IoT devices.

The hub 1014 may have a constant/persistent or intermittent connection to the network node 1010*b*. The hub 1014 may also allow for a different communication scheme and/or schedule between the hub 1014 and UEs (e.g., UE 1012*c* and/or 1012*d*), and between the hub 1014 and the core network 1006. In other examples, the hub 1014 is connected to the core network 1006 and/or one or more UEs via a wired connection. Moreover, the hub 1014 may be configured to connect to an M2M service provider over the access network 1004 and/or to another UE over a direct connection. In some scenarios, UEs may establish a wireless connection with the network nodes 1010 while still connected via the hub 1014 via a wired or wireless connection. In some embodiments, the hub 1014 may be a dedicated hub—that is, a hub whose primary function is to route communications to/from the UEs from/to the network node 1010*b*. In other embodiments, the hub 1014 may be a non-dedicated hub—that is, a device which is capable of operating to route communications between the UEs and network node 1010*b*, but which is additionally capable of operating as a communication start and/or end point for certain data channels.

In various embodiments, hub 1014 can include circuitry (e.g., processing circuitry and communication interface circuitry) similar to circuitry included in UEs and network nodes, as described in more detail below. In some embodiments, hub 1014 can be configured to perform operations attributed to a controller for a plurality of UEs coupled to a TSN end station, such as described above in relation to other figures.

Figure 11:
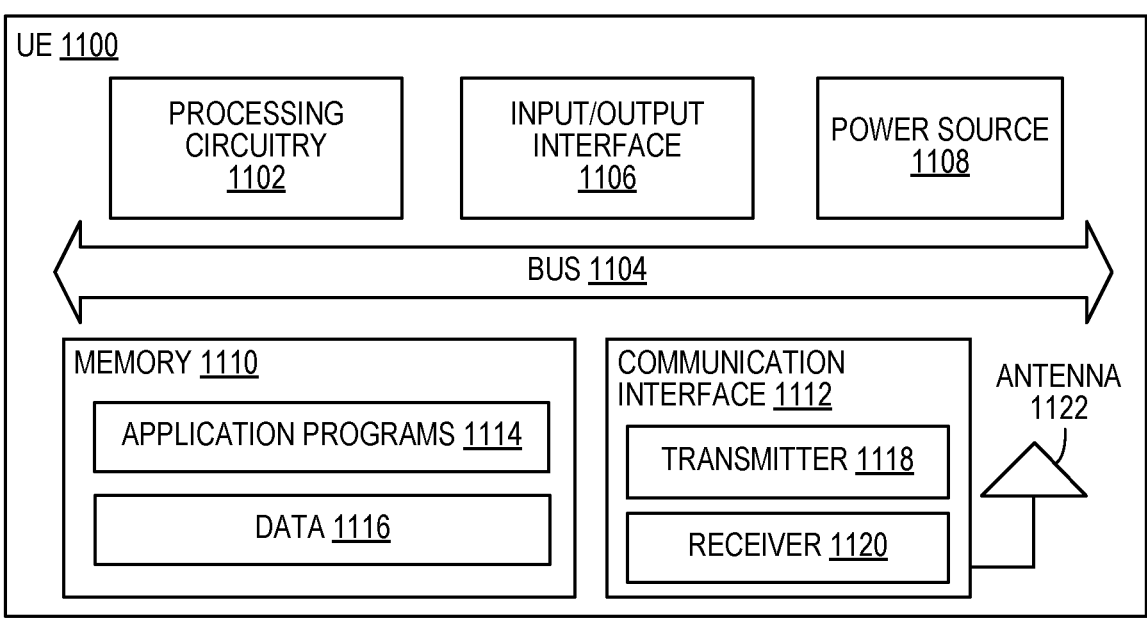
FIG. 11 shows a UE according to various embodiments of the present disclosure.

FIG. 11 shows a UE 1100 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1100 includes processing circuitry 1102 that is operatively coupled via a bus 1104 to an input/output interface 1106, a power source 1108, a memory 1110, a communication interface 1112, and/or any other component, or any combination thereof. Certain UEs may utilize all or a subset of the components shown in FIG. 11. The level of integration between the components may vary from one UE to another UE. Further, certain UEs may contain multiple instances of a component, such as multiple processors, memories, transceivers, transmitters, receivers, etc.

The processing circuitry 1102 is configured to process instructions and data and may be configured to implement any sequential state machine operative to execute instructions stored as machine-readable computer programs in the memory 1110. The processing circuitry 1102 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1102 may include multiple central processing units (CPUs).

In the example, the input/output interface 1106 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1100. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1108 is structured as a battery or battery pack. Other types of power sources, such as an external power source (e.g., an electricity outlet), photovoltaic device, or power cell, may be used. The power source 1108 may further include power circuitry for delivering power from the power source 1108 itself, and/or an external power source, to the various parts of the UE 1100 via input circuitry or an interface such as an electrical power cable. Delivering power may be, for example, for charging of the power source 1108. Power circuitry may perform any formatting, converting, or other modification to the power from the power source 1108 to make the power suitable for the respective components of the UE 1100 to which power is supplied.

The memory 1110 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1110 includes one or more application programs 1114, such as an operating system, web browser application, a widget, gadget engine, or other application, and corresponding data 1116. The memory 1110 may store, for use by the UE 1100, any of a variety of various operating systems or combinations of operating systems.

The memory 1110 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1110 may allow the UE 1100 to access instructions, application programs and the like, stored on transitory or non-transitory memory media, to off-load data, or to upload data. An article of manufacture, such as one utilizing a communication system may be tangibly embodied as or in the memory 1110, which may be or comprise a device-readable storage medium.

The processing circuitry 1102 may be configured to communicate with an access network or other network using the communication interface 1112. The communication interface 1112 may comprise one or more communication subsystems and may include or be communicatively coupled to an antenna 1122. The communication interface 1112 may include one or more transceivers used to communicate, such as by communicating with one or more remote transceivers of another device capable of wireless communication (e.g., another UE or a network node in an access network). Each transceiver may include a transmitter 1118 and/or a receiver 1120 appropriate to provide network communications (e.g., optical, electrical, frequency allocations, and so forth). Moreover, the transmitter 1118 and receiver 1120 may be coupled to one or more antennas (e.g., antenna 1122) and may share circuit components, software or firmware, or alternatively be implemented separately.

In the illustrated embodiment, communication functions of the communication interface 1112 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), time sensitive networking (TSN), and so forth.

Regardless of the type of sensor, a UE may provide an output of data captured by its sensors, through its communication interface 1112, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1100 shown in FIG. 11.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 12:
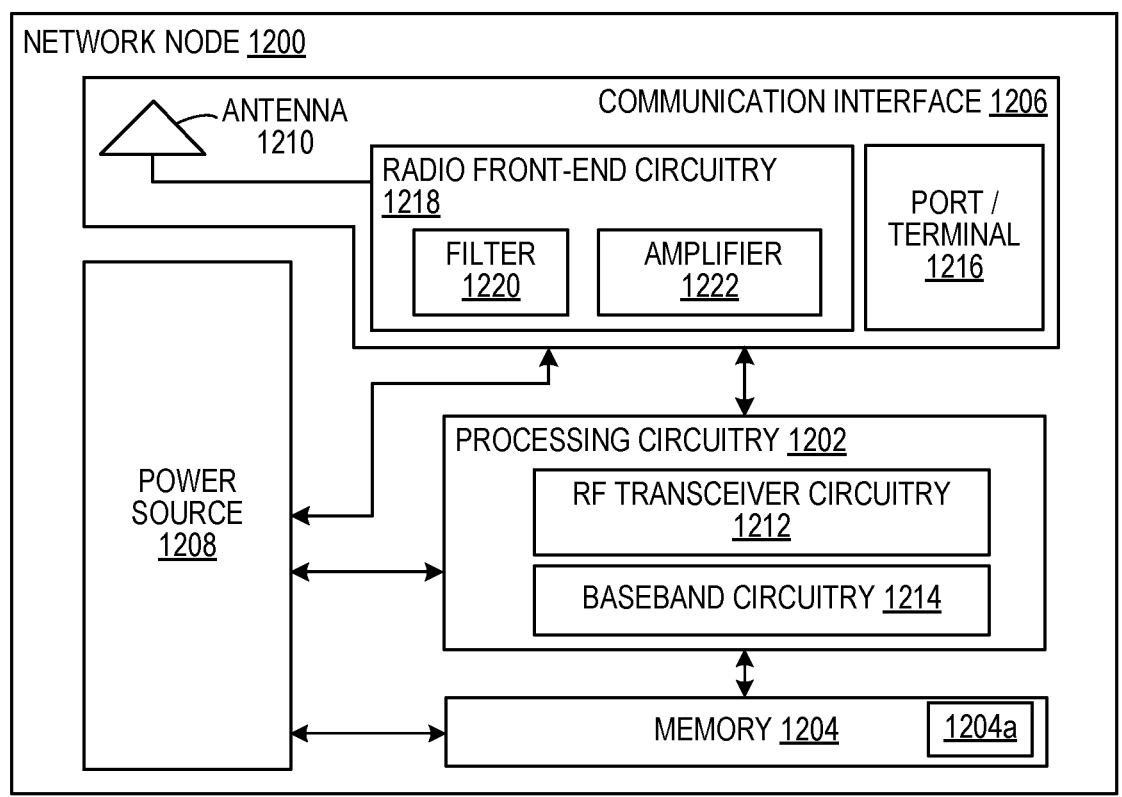
FIG. 12 shows a network node according to various embodiments of the present disclosure.

FIG. 12 shows a network node 1200 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs)).

The network node 1200 includes a processing circuitry 1202, a memory 1204, a communication interface 1206, and a power source 1208. The network node 1200 may be composed of multiple physically separate components (e.g., a NodeB component and a RNC component, or a BTS component and a BSC component, etc.), which may each have their own respective components. In certain scenarios in which the network node 1200 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1200 may be configured to support multiple radio access technologies (RATs). In such embodiments, some components may be duplicated (e.g., separate memory 1204 for different RATs) and some components may be reused (e.g., a same antenna 1210 may be shared by different RATs). The network node 1200 may also include multiple sets of the various illustrated components for different wireless technologies integrated into network node 1200, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1200.

The processing circuitry 1202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1200 components, such as the memory 1204, to provide network node 1200 functionality.

In some embodiments, the processing circuitry 1202 includes a system on a chip (SOC). In some embodiments, the processing circuitry 1202 includes one or more of radio frequency (RF) transceiver circuitry 1212 and baseband processing circuitry 1214. In some embodiments, the radio frequency (RF) transceiver circuitry 1212 and the baseband processing circuitry 1214 may be on separate chips (or sets of chips), boards, or units, such as radio units and digital units. In alternative embodiments, part or all of RF transceiver circuitry 1212 and baseband processing circuitry 1214 may be on the same chip or set of chips, boards, or units.

The memory 1204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1202. The memory 1204 may store any suitable instructions, data, or information, including a computer program, software, an application including one or more of logic, rules, code, tables, and/or other instructions (collectively denoted computer program product 1204a) capable of being executed by the processing circuitry 1202 and utilized by the network node 1200. The memory 1204 may be used to store any calculations made by the processing circuitry 1202 and/or any data received via the communication interface 1206. In some embodiments, the processing circuitry 1202 and memory 1204 is integrated.

The communication interface 1206 is used in wired or wireless communication of signaling and/or data between a network node, access network, and/or UE. As illustrated, the communication interface 1206 comprises port(s)/terminal(s) 1216 to send and receive data, for example to and from a network over a wired connection. The communication interface 1206 also includes radio front-end circuitry 1218 that may be coupled to, or in certain embodiments a part of, the antenna 1210. Radio front-end circuitry 1218 comprises filters 1220 and amplifiers 1222. The radio front-end circuitry 1218 may be connected to an antenna 1210 and processing circuitry 1202. The radio front-end circuitry may be configured to condition signals communicated between antenna 1210 and processing circuitry 1202. The radio front-end circuitry 1218 may receive digital data that is to be sent out to other network nodes or UEs via a wireless connection. The radio front-end circuitry 1218 may convert the digital data into a radio signal having the appropriate channel and bandwidth parameters using a combination of filters 1220 and/or amplifiers 1222. The radio signal may then be transmitted via the antenna 1210. Similarly, when receiving data, the antenna 1210 may collect radio signals which are then converted into digital data by the radio front-end circuitry 1218. The digital data may be passed to the processing circuitry 1202. In other embodiments, the communication interface may comprise different components and/or different combinations of components.

In certain alternative embodiments, the network node 1200 does not include separate radio front-end circuitry 1218, instead, the processing circuitry 1202 includes radio front-end circuitry and is connected to the antenna 1210. Similarly, in some embodiments, all or some of the RF transceiver circuitry 1212 is part of the communication interface 1206. In still other embodiments, the communication interface 1206 includes one or more ports or terminals 1216, the radio front-end circuitry 1218, and the RF transceiver circuitry 1212, as part of a radio unit (not shown), and the communication interface 1206 communicates with the baseband processing circuitry 1214, which is part of a digital unit (not shown).

The antenna 1210 may include one or more antennas, or antenna arrays, configured to send and/or receive wireless signals. The antenna 1210 may be coupled to the radio front-end circuitry 1218 and may be any type of antenna capable of transmitting and receiving data and/or signals wirelessly. In certain embodiments, the antenna 1210 is separate from the network node 1200 and connectable to the network node 1200 through an interface or port.

The antenna 1210, communication interface 1206, and/or the processing circuitry 1202 may be configured to perform any receiving operations and/or certain obtaining operations described herein as being performed by the network node. Any information, data and/or signals may be received from a UE, another network node and/or any other network equipment. Similarly, the antenna 1210, the communication interface 1206, and/or the processing circuitry 1202 may be configured to perform any transmitting operations described herein as being performed by the network node. Any information, data and/or signals may be transmitted to a UE, another network node and/or any other network equipment.

The power source 1208 provides power to the various components of network node 1200 in a form suitable for the respective components (e.g., at a voltage and current level needed for each respective component). The power source 1208 may further comprise, or be coupled to, power management circuitry to supply the components of the network node 1200 with power for performing the functionality described herein. For example, the network node 1200 may be connectable to an external power source (e.g., the power grid, an electricity outlet) via an input circuitry or interface such as an electrical cable, whereby the external power source supplies power to power circuitry of the power source 1208. As a further example, the power source 1208 may comprise a source of power in the form of a battery or battery pack which is connected to, or integrated in, power circuitry. The battery may provide backup power should the external power source fail.

Embodiments of the network node 1200 may include additional components beyond those shown in FIG. 12 for providing certain aspects of the network node's functionality, including any of the functionality described herein and/or any functionality necessary to support the subject matter described herein. For example, the network node 1200 may include user interface equipment to allow input of information into the network node 1200 and to allow output of information from the network node 1200. This may allow a user to perform diagnostic, maintenance, repair, and other administrative functions for the network node 1200.

Figure 13:
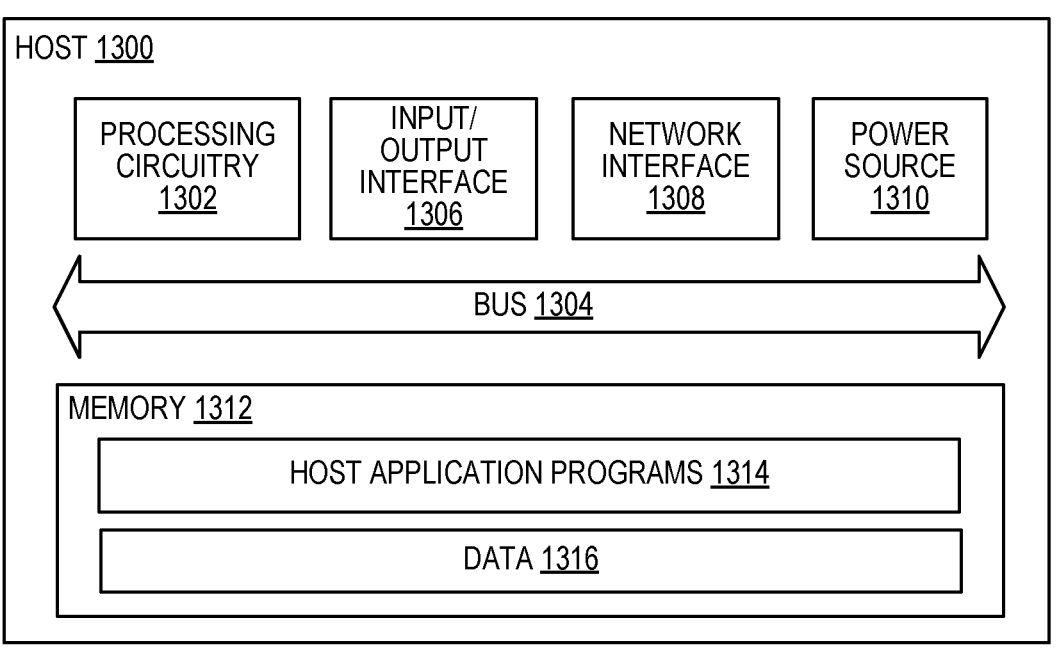
FIG. 13 shows host computing system according to various embodiments of the present disclosure.

FIG. 13 is a block diagram of a host 1300, which may be an embodiment of the host 1016 of FIG. 10, in accordance with various aspects described herein. As used herein, the host 1300 may be or comprise various combinations hardware and/or software, including a standalone server, a blade server, a cloud-implemented server, a distributed server, a virtual machine, container, or processing resources in a server farm. The host 1300 may provide one or more services to one or more UEs.

The host 1300 includes processing circuitry 1302 that is operatively coupled via a bus 1304 to an input/output interface 1306, a network interface 1308, a power source 1310, and a memory 1312. Other components may be included in other embodiments. Features of these components may be substantially similar to those described with respect to the devices of previous figures, such as FIGS. 11 and 12, such that the descriptions thereof are generally applicable to the corresponding components of host 1300.

The memory 1312 may include one or more computer programs including one or more host application programs 1314 and data 1316, which may include user data, e.g., data generated by a UE for the host 1300 or data generated by the host 1300 for a UE. Embodiments of the host 1300 may utilize only a subset or all of the components shown. The host application programs 1314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1314 may also provide for user authentication and licensing checks and may periodically report health, routes, and content availability to a central node, such as a device in or on the edge of a core network.

Accordingly, the host 1300 may select and/or indicate a different host for over-the-top services for a UE. The host application programs 1314 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 14:
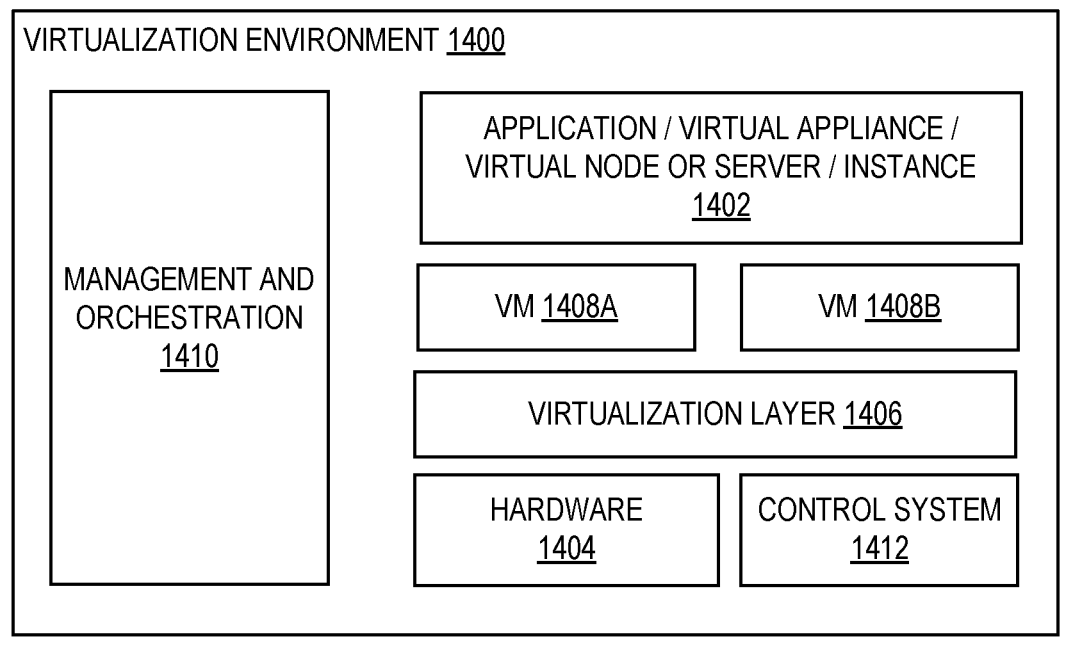
FIG. 14 is a block diagram of a virtualization environment in which functions implemented by some embodiments of the present disclosure may be virtualized.

FIG. 14 is a block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1400 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1402 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1404 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1406 (also referred to as hypervisors or virtual machine monitors (VMMs)), provide VMs 1408a and 1408b (one or more of which may be generally referred to as VMs 1408), and/or perform any of the functions, features and/or benefits described in relation with some embodiments described herein. The virtualization layer 1406 may present a virtual operating platform that appears like networking hardware to the VMs 1408.

The VMs 1408 comprise virtual processing, virtual memory, virtual networking or interface and virtual storage, and may be run by a corresponding virtualization layer 1406. Different embodiments of the instance of a virtual appliance 1402 may be implemented on one or more of VMs 1408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1408 may be a software implementation of a physical machine that runs programs as if they were executing on a physical, non-virtualized machine. Each of the VMs 1408, and that part of hardware 1404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1408 on top of the hardware 1404 and corresponds to the application 1402.

Hardware 1404 may be implemented in a standalone network node with generic or specific components. Hardware 1404 may implement some functions via virtualization. Alternatively, hardware 1404 may be part of a larger cluster of hardware (e.g., such as in a data center or CPE) where many hardware nodes work together and are managed via management and orchestration 1410, which, among others, oversees lifecycle management of applications 1402. In some embodiments, hardware 1404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1412 which may alternatively be used for communication between hardware nodes and radio units.

Figure 15:
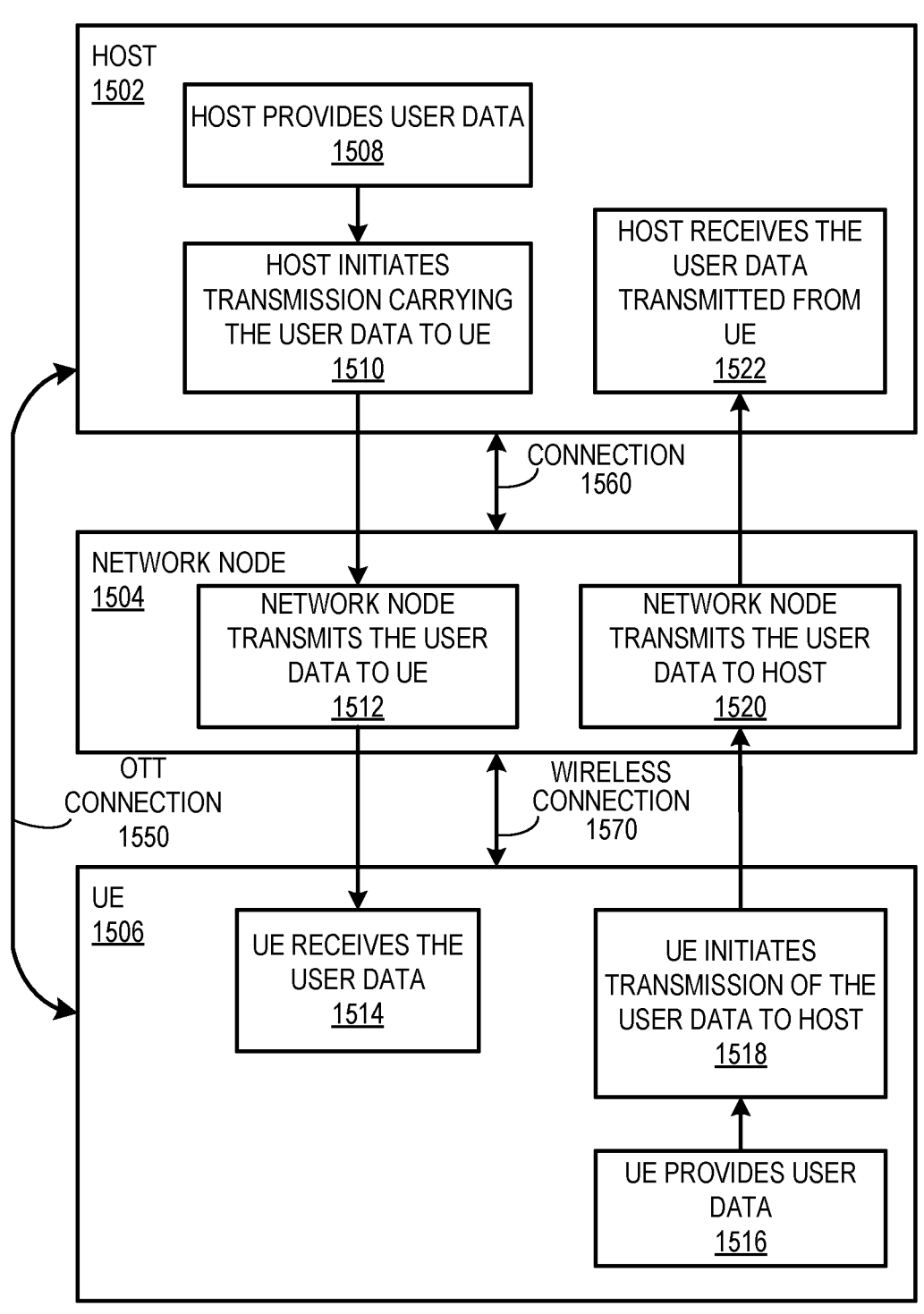
FIG. 15 illustrates communication between a host computing system, a network node, and a UE via multiple connections, at least one of which is wireless, according to various embodiments of the present disclosure.

FIG. 15 shows a communication diagram of a host 1502 communicating via a network node 1504 with a UE 1506 over a partially wireless connection in accordance with some embodiments. Example implementations, in accordance with various embodiments, of the UE (such as a UE 1012a of FIG. 10 and/or UE 1100 of FIG. 11), network node (such as network node 1010a of FIG. 10 and/or network node 1200 of FIG. 12), and host (such as host 1016 of FIG. 10 and/or host 1300 of FIG. 13) discussed in the preceding paragraphs will now be described with reference to FIG. 15.

Like host 1300, embodiments of host 1502 include hardware, such as a communication interface, processing circuitry, and memory. The host 1502 also includes software, which is stored in or accessible by the host 1502 and executable by the processing circuitry. The software includes a host application that may be operable to provide a service to a remote user, such as the UE 1506 connecting via an over-the-top (OTT) connection 1550 extending between the UE 1506 and host 1502. In providing the service to the remote user, a host application may provide user data which is transmitted using the OTT connection 1550.

The network node 1504 includes hardware enabling it to communicate with the host 1502 and UE 1506. The connection 1560 may be direct or pass through a core network (like core network 1006 of FIG. 10) and/or one or more other intermediate networks, such as one or more public, private, or hosted networks. For example, an intermediate network may be a backbone network or the Internet.

The UE 1506 includes hardware and software, which is stored in or accessible by UE 1506 and executable by the UE's processing circuitry. The software includes a client application, such as a web browser or operator-specific "app" that may be operable to provide a service to a human or non-human user via UE 1506 with the support of the host 1502. In the host 1502, an executing host application may communicate with the executing client application via the OTT connection 1550 terminating at the UE 1506 and host 1502. In providing the service to the user, the UE's client application may receive request data from the host's host application and provide user data in response to the request data. The OTT connection 1550 may transfer both the request data and the user data. The UE's client application may interact with the user to generate the user data that it provides to the host application through the OTT connection 1550.

The OTT connection 1550 may extend via a connection 1560 between the host 1502 and the network node 1504 and via a wireless connection 1570 between the network node 1504 and the UE 1506 to provide the connection between the host 1502 and the UE 1506. The connection 1560 and wireless connection 1570, over which the OTT connection 1550 may be provided, have been drawn abstractly to illustrate the communication between the host 1502 and the UE 1506 via the network node 1504, without explicit reference to any intermediary devices and the precise routing of messages via these devices.

As an example of transmitting data via the OTT connection 1550, in step 1508, the host 1502 provides user data, which may be performed by executing a host application. In some embodiments, the user data is associated with a particular human user interacting with the UE 1506. In other embodiments, the user data is associated with a UE 1506 that shares data with the host 1502 without explicit human interaction. In step 1510, the host 1502 initiates a transmission carrying the user data towards the UE 1506. The host 1502 may initiate the transmission responsive to a request transmitted by the UE 1506. The request may be caused by human interaction with the UE 1506 or by operation of the client application executing on the UE 1506. The transmission may pass via the network node 1504, in accordance with the teachings of the embodiments described throughout this disclosure. Accordingly, in step 1512, the network node 1504 transmits to the UE 1506 the user data that was carried in the transmission that the host 1502 initiated, in accordance with the teachings of the embodiments described throughout this disclosure. In step 1514, the UE 1506 receives the user data carried in the transmission, which may be performed by a client application executed on the UE 1506 associated with the host application executed by the host 1502.

In some examples, the UE 1506 executes a client application which provides user data to the host 1502. The user data may be provided in reaction or response to the data received from the host 1502. Accordingly, in step 1516, the UE 1506 may provide user data, which may be performed by executing the client application. In providing the user data, the client application may further consider user input received from the user via an input/output interface of the UE 1506. Regardless of the specific manner in which the user data was provided, the UE 1506 initiates, in step 1518, transmission of the user data towards the host 1502 via the network node 1504. In step 1520, in accordance with the teachings of the embodiments described throughout this disclosure, the network node 1504 receives user data from the UE 1506 and initiates transmission of the received user data towards the host 1502. In step 1522, the host 1502 receives the user data carried in the transmission initiated by the UE 1506.

One or more of the various embodiments improve the performance of OTT services provided to the UE 1506 using the OTT connection 1550, in which the wireless connection 1570 forms the last segment. More precisely, the teachings of these embodiments may improve the accuracy and/or reduce uncertainty of relationships between a 5GSC and a TSN GM, thereby facilitating compliance with end-to-end accuracy requirements for delivery of TSN time information from TSN GM clocks to remotely located end stations connected to a 5G network. For example, this can be beneficial for devices in a factory setting that may have strict accuracy requirements for which violation could result in harm to workers and/or factory operations. Embodiments can increase availability of such devices with strict accuracy requirements, which increases value for end-users (e.g., factories) and providers of services, including OTT services.

In an example scenario, factory status information may be collected and analyzed by the host 1502. As another example, the host 1502 may process audio and video data which may have been retrieved from a UE for use in creating maps. As another example, the host 1502 may collect and analyze real-time data to assist in controlling vehicle congestion (e.g., controlling traffic lights). As another example, the host 1502 may store surveillance video uploaded by a UE. As another example, the host 1502 may store or control access to media content such as video, audio, VR or AR which it can broadcast, multicast or unicast to UEs. As other examples, the host 1502 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1550 between the host 1502 and UE 1506, in response to variations in the measurement results. The measurement procedure and/or the network functionality for reconfiguring the OTT connection may be implemented in software and hardware of the host 1502 and/or UE 1506. In some embodiments, sensors (not shown) may be deployed in or in association with other devices through which the OTT connection 1550 passes; the sensors may participate in the measurement procedure by supplying values of the monitored quantities exemplified above or supplying values of other physical quantities from which software may compute or estimate the monitored quantities. The reconfiguring of the OTT connection 1550 may include message format, retransmission settings, preferred routing etc.; the reconfiguring need not directly alter the operation of the network node 1504. Such procedures and functionalities may be known and practiced in the art. In certain embodiments, measurements may involve proprietary UE signaling that facilitates measurements of throughput, propagation times, latency and the like, by the host 1502. The measurements may be implemented in that software causes messages to be transmitted, in particular empty or 'dummy' messages, using the OTT connection 1550 while monitoring propagation times, errors, etc.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated embodiments:

A1. A method for a controller of a plurality of user equipment (UE) that are served by a network node in a radio access network (RAN), the method comprising:

receiving information about the following from each of the UEs:

one or more first measurements ($UE_{DL,Rx}$) of respective timing events of the radio link between the UE and the network node; and one or more second measurements of respective time differences ($UE_{RxTxDiff}$) between the UE receiving a downlink (DL) reference signal (RS) and transmitting a corresponding uplink (UL) RS;

based on the first measurements and the second measurements, selecting one of the plurality of UEs to provide a time-sensitive network (TSN) end station with a message timestamped by a system clock time, associated with the RAN, that is based on at least one first measurement and at least one second measurement.

A2. The method of embodiment A1, wherein selecting one of the plurality of UEs comprises:

determining which of the plurality of UEs has least variability in the first measurements and the second measurements; and selecting the UE having least variability to provide the system clock time associated with the RAN to the TSN end station.

A3. The method of embodiment A2, wherein the information about the first and second measurements, from each of the UEs, comprises a first variability of the first measurements and a second variability of the second measurements.

A4. The method of embodiment A2, wherein:

the information about the first and second measurements, from each of the UEs, comprises a plurality of first measurements and a plurality of second measurements; and selecting one of the plurality of UEs further comprises determining, for each of the UEs, a first variability of the plurality of first measurements and a second variability of the plurality of second measurements.

A5. The method of embodiment A4, wherein the plurality of first measurements and the plurality of second measurements are for a period between successive TSN messages to the TSN end station.

A6. The method of any of embodiments A2-A5, wherein variability is based on one of the following: difference between minimum and maximum of the plurality of measurements, or standard deviation of the plurality of measurements.

A7. The method of any of any of embodiments A1-A6, wherein the timing events are ends of frames identified by respective system frame numbers (SFNs) in timing messages from the network node.

A8. The method of any of embodiments A1-A7, further comprising sending, to the selected UE, an indication for the selected UE to provide the TSN end station with the message timestamped by the system clock time.

B1. A method for a user equipment (UE) operable in a radio access network (RAN) as one of a plurality of UEs coupled to an end station in a time sensitive network (TSN), the method comprising:

performing the following measurements:

one or more first measurements ($UE_{DL,Rx}$) of respective timing events of the radio link between the UE and the network node; and one or more second measurements of respective time differences ($UE_{RxTxDiff}$) between the UE receiving a downlink (DL) reference signal (RS) and transmitting a corresponding uplink (UL) RS;

sending information about the first and second measurements to a controller of the plurality of UEs; and based on receiving an indication from the controller, providing the TSN end station with a message timestamped by a system clock time, associated with the RAN, that is based on at least one first measurement and at least one second measurement.

B2. The method of embodiment B1, wherein the measurements include a plurality of first measurements and a plurality of second measurements.

B3. The method of embodiment B2, the information about the first and second measurements comprises the plurality of first measurements and the plurality of second measurements.

B4. The method of embodiment B2, wherein:

the method further comprises determining a first variability of the plurality of first measurements and a second variability of the plurality of second measurements; and the information about the first and second measurements comprises the first variability and the second variability.

B5. The method of embodiment B4, wherein variability is based on one of the following: difference between minimum and maximum of the plurality of measurements, or standard deviation of the plurality of measurements.

B6. The method of any of embodiments B2-B5, wherein the plurality of first measurements and the plurality of second measurements are performed during a period between successive TSN messages to the TSN end station.

B7. The method of any of any of embodiments B1-B6, wherein the timing events are ends of frames identified by respective system frame numbers (SFNs) in timing messages from the network node.

B8. The method of any of embodiments B1-B7, further comprising:

receiving, from the network node, an indication of a system clock time associated with the RAN;

receiving, from the network node, a TSN message indicating a time associated with a grandmaster clock of the TSN (TSN GM); and timestamping the TSN message based on the indicated system clock time and at least one first measurement.

B9. The method of embodiment B8, further comprising sending the second measurements to the network node, wherein the system clock time received from the network node is compensated for DL PD based on at least one second measurement.

B10. The method of embodiment B8, further comprising:

receiving, from the network node, one or more third measurements of respective time differences ($gNB_{RxTxDiff}$) between the network node receiving an uplink (UL) reference signal (RS) and transmitting a corresponding downlink (DL) RS; and compensating the indicated system clock time for downlink propagation delay (DL PD) based on at least one second measurement and at least one third measurement, wherein the compensated system clock time is used to timestamp the TSN message.

C1. A controller for a plurality of user equipment (UE) that are served by a network node in a radio access network (RAN), the controller comprising:

communication interface circuitry configured to communicate with the UEs and with an end station in a time-sensitive network (TSN); and processing circuitry operably coupled to the communication interface circuitry, whereby the processing circuitry and the communication interface circuitry are configured to perform operations corresponding to any of the methods of embodiments A1-A8.

C2. A controller for a plurality of user equipment (UE) that are served by a network node in a radio access network (RAN), the controller being configured to perform operations corresponding to any of the methods of embodiments A1-A8.

C3. A non-transitory, computer-readable medium storing program instructions that, when executed by processing circuitry of controller for a plurality of user equipment (UE) that are served by a network node in a radio access network (RAN), configure the controller to perform operations corresponding to any of the methods of embodiments A1-A8.

C4. A computer program product comprising program instructions that, when executed by processing circuitry of a controller for a plurality of user equipment (UE) that are served by a network node in a radio access network (RAN), configure the controller to perform operations corresponding to any of the methods of embodiments A1-A8.

D1. A user equipment (UE) operable in a radio access network (RAN) as one of a plurality of UEs coupled to an end station in a time sensitive network (TSN), the UE comprising:

communication interface circuitry configured to communicate with a network node in the RAN and with the TSN end station; and processing circuitry operably coupled to the communication circuitry, whereby the processing circuitry and the communication circuitry are configured to perform operations corresponding to any of the methods of embodiments B1-B10.

D2. A user equipment (UE) operable in a radio access network (RAN) as one of a plurality of UEs coupled to an end station in a time sensitive network (TSN), the UE being configured to perform operations corresponding to any of the methods of embodiments B1-B10.

D3. A non-transitory, computer-readable medium storing program instructions that, when executed by processing circuitry of a user equipment (UE) operable in a radio access network (RAN) as one of a plurality of UEs coupled to an end station in a time sensitive network (TSN), configure the UE to perform operations corresponding to any of the methods of embodiments B1-B10.

D4. A computer program product comprising program instructions that, when executed by processing circuitry of a user equipment (UE) operable in a radio access network (RAN) as one of a plurality of UEs coupled to an end station in a time sensitive network (TSN), configure the UE to perform operations corresponding to any of the methods of embodiments B1-B10.

The invention claimed is:

1. A method performed by a controller of a plurality of user equipment (UEs) that are served by a radio access network (RAN) node, the method comprising:

receiving information about the following from each of the UEs:

first measurements, $UE_{DL,Rx}$, of respective timing events of the radio link between the UE and the RAN node; and second measurements, $UE_{RxTxDiff}$, of respective time differences between the UE receiving a downlink (DL) reference signal (RS) and transmitting a corresponding uplink (UL) RS; and based on the received information, selecting one of the plurality of UEs to provide a time-sensitive network (TSN) end station with a TSN message timestamped by a system clock time that is associated with the RAN and that is based on at least one first measurement and at least one second measurement.

2. The method of claim 1, wherein selecting one of the plurality of UEs comprises:

determining which of the plurality of UEs has least variability in the first measurements and the second measurements; and selecting the UE having least variability to provide the system clock time associated with the RAN to the TSN end station.

3. The method of claim 2, wherein, for each of the UEs, the received information about the first measurements comprises a first variability of the first measurements and the received information about the second measurements comprises a second variability of the second measurements.

4. The method of claim 2, wherein:

for each of the UEs, the received information about the first measurements comprises a plurality of the first measurements and the received information about the second measurements comprises a plurality of the second measurements; and selecting one of the plurality of UEs further comprises determining, for each of the UEs, a first variability of the plurality of the first measurements and a second variability of the plurality of the second measurements.

5. The method of claim 4, wherein the plurality of the first measurements and the plurality of the second measurements, received from each of the UEs, are during a period since one of the UEs provided a most recent timestamped TSN message to the TSN end station.

6. The method of claim 3, wherein each of the first and second variabilities is based on one of the following: difference between minimum and maximum of the corresponding plurality of measurements, or standard deviation of the corresponding plurality of measurements.

7. The method of claim 1, wherein the timing events are ends of frames identified by respective system frame numbers (SFNs) in timing messages from the RAN node.

8. The method of claim 1, further comprising sending, to the selected UE, an indication for the selected UE to provide the TSN end station with a TSN message timestamped by the system clock time.

9. A method for a user equipment (UE) configured to operate in a radio access network (RAN) as one of a plurality of UEs coupled to a time sensitive network (TSN) end station, the method comprising:

performing the following measurements:

first measurements, $UE_{DL,Rx}$, of respective timing events of the radio link between the UE and a RAN node; and second measurements, $UE_{RxTxDiff}$, of respective time differences between the UE receiving a downlink (DL) reference signal (RS) and transmitting a corresponding uplink (UL) RS;

sending information about the first measurements and information about the second measurements to a controller of the plurality of UEs; and based on an indication received from the controller, providing the TSN end station with a TSN message timestamped by a system clock time that is associated with the RAN and that is based on at least one first measurement and on at least one second measurement.

10. The method of claim 9, wherein the information about the first measurements comprises a plurality of the first measurements and the information about the second measurements comprises a plurality of the second measurements.

11. The method of claim 9, wherein:

the method further comprises determining a first variability of a plurality of the first measurements and a second variability of a plurality of the second measurements; and the information about the first measurements comprises the first variability and the information about the second measurements comprises the second variability.

12. The method of claim 11, wherein each of the first and second variabilities is determined based on one of the following: difference between minimum and maximum of the corresponding plurality of measurements, or standard deviation of the corresponding plurality of measurements.

13. The method of claim 10, wherein the plurality of first measurements and the plurality of second measurements are performed during a period since providing a most recent timestamped TSN message to the TSN end station.

14. The method of claim 9, wherein the timing events are ends of frames identified by respective system frame numbers (SFNs) in timing messages from the RAN node.

15. The method of claim 9, further comprising:

receiving, from the RAN node, an indication of a system clock time associated with the RAN;

receiving the TSN message from the RAN node, wherein the TSN message indicates a time associated with a grandmaster clock of the TSN (TSN GM); and timestamping the TSN message based on the following: the indicated system clock time, and at least one first measurement.

16. The method of claim 15, further comprising sending the second measurements to the RAN node, wherein the system clock time received from the RAN node is compensated for DL propagation delay based on at least one second measurement.

17. The method of claim 15, further comprising:

receiving, from the RAN node, one or more third measurements, $gNB_{RxTxDiff}$, of respective time differences between the RAN node receiving an UL RS and transmitting a corresponding DL RS; and compensating the indicated system clock time for DL propagation delay based on at least one second measurement and at least one third measurement, wherein timestamping the TSN message is based on the compensated system clock time and the at least one first measurement.

18. The method of claim 9, wherein the indication is received from the controller in response to sending the information about the first measurements and the information about the second measurements.

19. A controller for a plurality of user equipment (UEs) that are served by a radio access network (RAN) node, the controller comprising:

communication interface circuitry configured to communicate with the UEs and with a time-sensitive network (TSN) end station; and processing circuitry operably coupled to the communication interface circuitry, whereby the processing circuitry and the communication interface circuitry are configured to:

receive information about the following from each of the UEs:

first measurements, $UE_{DL,Rx}$, of respective timing events of the radio link between the UE and the RAN node; and second measurements, $UE_{RxTxDiff}$, of respective time differences between the UE receiving a downlink (DL) reference signal (RS) and transmitting a corresponding uplink (UL) RS;

based on the received information, select one of the plurality of UEs to provide the TSN end station with a TSN message timestamped by a system clock time that is associated with the RAN and that is based on at least one first measurement and at least one second measurement.

20. A user equipment (UE) configured to operate in a radio access network (RAN) as one of a plurality of UEs coupled to a time sensitive network (TSN) end station, the UE comprising:

communication interface circuitry configured to communicate with a RAN node, with the TSN end station, and with a controller for the plurality of UEs; and processing circuitry operably coupled to the communication circuitry, whereby the processing circuitry and the communication circuitry are configured to:

perform the following measurements:

first measurements, $UE_{DL,Rx}$, of respective timing events of the radio link between the UE and the RAN node; and second measurements, $UE_{RxTxDiff}$, of respective time differences between the UE receiving a downlink (DL) reference signal (RS) and transmitting a corresponding uplink (UL) RS;

send information about the first measurements and information about the second measurements to the controller; and based on an indication received from the controller, provide the TSN end station with a TSN message timestamped by a system clock time that is associated with the RAN and that is based on at least one first measurement and on at least one second measurement.

* * * * *